US010129152B2

(12) United States Patent
Kano

(10) Patent No.: US 10,129,152 B2
(45) Date of Patent: Nov. 13, 2018

(54) SETTING METHOD, SERVER DEVICE AND SERVICE CHAIN SYSTEM

(71) Applicant: FUJITSU LIMITED, Kawasaki-shi, Kanagawa (JP)

(72) Inventor: Shinya Kano, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 157 days.

(21) Appl. No.: 15/270,802

(22) Filed: Sep. 20, 2016

(65) Prior Publication Data

US 2017/0093721 A1    Mar. 30, 2017

(30) Foreign Application Priority Data

Sep. 25, 2015  (JP) ................... 2015-188947
Aug. 18, 2016  (JP) ................... 2016-160310

(51) Int. Cl.
| | |
|---|---|
| *H04L 12/911* | (2013.01) |
| *H04L 12/803* | (2013.01) |
| *H04L 12/707* | (2013.01) |
| *H04L 29/08* | (2006.01) |
| *H04L 12/931* | (2013.01) |

(52) U.S. Cl.
CPC ............ *H04L 47/122* (2013.01); *H04L 45/24* (2013.01); *H04L 67/1038* (2013.01); *H04L 49/70* (2013.01); *H04L 67/10* (2013.01)

(58) Field of Classification Search
CPC ........ H04L 47/122; H04L 67/10; H04L 49/70
See application file for complete search history.

(56) References Cited

U.S. PATENT DOCUMENTS

| | | | |
|---|---|---|---|
| 2014/0025824 A1 | 1/2014 | Takahashi | |
| 2015/0124622 A1 | 5/2015 | Kovvali et al. | |
| 2015/0172170 A1 | 6/2015 | Bosch et al. | |
| 2016/0328258 A1* | 11/2016 | Iwashina | ............ G06F 9/45533 |
| 2017/0142024 A1* | 5/2017 | Fromentoux | ........... H04L 47/70 |

FOREIGN PATENT DOCUMENTS

| | | |
|---|---|---|
| JP | 2014-021854 A | 2/2014 |
| JP | 2014-225157 A | 12/2014 |

OTHER PUBLICATIONS

EESR—Extended European Search Report issued for European Patent Application No. 16188937.3 dated Feb. 20, 2017.

* cited by examiner

*Primary Examiner* — Jay P Patel
(74) *Attorney, Agent, or Firm* — Fujitsu Patent Center

(57) ABSTRACT

The server device decides, when virtual communication function groups are arranged in a plurality of stages in a virtual area, a virtual distributed function that is to be arranged in the previous stage of the virtual communication function group that is in a first stage of the plurality of stages. The server device decides a communication path based on a load from the virtual distributed function to each of the virtual communication functions in a terminal virtual communication function group from among the plurality stages of the virtual communication function groups. The server device sets the decided communication path to the virtual distributed function and each of the virtual communication functions arranged in the virtual area.

12 Claims, 24 Drawing Sheets

FIG.4

| | MESSAGE TYPE | CONFIGURATION REQUEST |
|---|---|---|
| 52 | REQUEST VNF COUNT | 6 |
| 53A | VNF #1 LB TYPE | L3 LEVEL LB |
| 54A | VNF #1 LB INSTANCE COUNT | 1 |
| 55A | VNF #1 TYPE | FW |
| 56A | VNF #1 INSTANCE COUNT | 4 |
| 53B | VNF #2 LB TYPE | L4 LEVEL LB |
| 54B | VNF #2 LB INSTANCE COUNT | 2 |
| 55B | VNF #2 TYPE | IDS |
| 56B | VNF #2 INSTANCE COUNT | 3 |
| 53C | VNF #3 LB TYPE | L4 LEVEL LB |
| 54C | VNF #3 LB INSTANCE COUNT | 2 |
| 55C | VNF #3 TYPE | Proxy |
| 56C | VNF #3 INSTANCE COUNT | 3 |
| 57 | TRANSMISSION SOURCE ADDRESS | TRANSMISSION SOURCE ADDRESS |
| 58 | DESTINATION ADDRESS | DESTINATION ADDRESS |

| MESSAGE TYPE | CONFIGURATION REQUEST |
|---|---|
| REQUEST VNF COUNT | 3 |
| VNF #1 TYPE | FW |
| VNF #1 INSTANCE COUNT | 4 |
| VNF #2 TYPE | IDS |
| VNF #2 INSTANCE COUNT | 3 |
| VNF #3 TYPE | Proxy |
| VNF #3 INSTANCE COUNT | 3 |
| TRANSMISSION SOURCE ADDRESS | TRANSMISSION SOURCE ADDRESS |
| DESTINATION ADDRESS | DESTINATION ADDRESS |

FIG.23

| | STATE OF BEFORE ADDITION OF FW5 | STATE OF AFTER ADDITION OF FW 5 |
|---|---|---|
| DISTRIBU-TION RATIO OF LB 1 | ·TRANSMIT 2/8 OF TOTAL AMOUNT OF TRAFFIC, I.E., 1/4 OF AMOUNT OF TRAFFIC RECEIVED BY LB 1, ADDRESSED TO PROXY 1 VIA FW 1<br>·TRANSMIT 1/8 OF TOTAL AMOUNT OF TRAFFIC, I.E., 1/8 OF AMOUNT OF TRAFFIC RECEIVED BY LB 1, ADDRESSED TO PROXY 2 VIA FW 2<br>·TRANSMIT 1/8 OF TOTAL AMOUNT OF TRAFFIC, I.E., 1/8 OF AMOUNT OF TRAFFIC RECEIVED BY LB 1, ADDRESSED TO PROXY 3 VIA FW 3 | ·TRANSMIT 2/10 OF TOTAL AMOUNT OF TRAFFIC, I.E., 1/5 OF AMOUNT OF TRAFFIC RECEIVED BY LB 1, ADDRESSED TO PROXY 1<br>·TRANSMIT 2/10 OF TOTAL AMOUNT OF TRAFFIC, I.E., 1/5 OF AMOUNT OF TRAFFIC RECEIVED BY LB 1, ADDRESSED TO PROXY 2<br>·TRANSMIT 1/10 OF TOTAL AMOUNT OF TRAFFIC, I.E., 1/10 OF AMOUNT OF TRAFFIC RECEIVED BY LB 1, ADDRESSED TO PROXY 3 |
| DISTRIBU-TION RATIO OF LB 2 | ·TRANSMIT 1/8 OF TOTAL AMOUNT OF TRAFFIC, I.E., 1/8 OF AMOUNT OF TRAFFIC RECEIVED BY LB 2, ADDRESSED TO PROXY 1 VIA FW 2<br>·TRANSMIT 1/8 OF TOTAL AMOUNT OF TRAFFIC, I.E., 1/8 OF AMOUNT OF TRAFFIC RECEIVED BY LB 2, ADDRESSED TO PROXY 2 VIA FW 3<br>·TRANSMIT 2/8 OF TOTAL AMOUNT OF TRAFFIC, I.E., 1/4 OF AMOUNT OF TRAFFIC RECEIVED BY LB 2, ADDRESSED TO PROXY 3 VIA FW 4 | ·TRANSMIT 1/10 OF TOTAL AMOUNT OF TRAFFIC, I.E., 1/10 OF AMOUNT OF TRAFFIC RECEIVED BY LB 2, ADDRESSED TO PROXY 1<br>·TRANSMIT 2/10 OF TOTAL AMOUNT OF TRAFFIC, I.E., 1/5 OF AMOUNT OF TRAFFIC RECEIVED BY LB 2, ADDRESSED TO PROXY 2<br>·TRANSMIT 2/10 OF TOTAL AMOUNT OF TRAFFIC, I.E., 1/5 OF AMOUNT OF TRAFFIC RECEIVED BY LB 2, ADDRESSED TO PROXY 3 |
| TRANSFER PATH OF LB 1 | ·TRANSMIT ADDRESSED TO PROXY 1 VIA FW 1<br>·TRANSMIT ADDRESSED TO PROXY 2 VIA FW 2<br>·TRANSMIT ADDRESSED TO PROXY 3 VIA FW 3 | ·TRANSMIT ADDRESSED TO PROXY 1 VIA FW 1<br>·TRANSMIT ADDRESSED TO PROXY 2 VIA FW 2<br>·TRANSMIT ADDRESSED TO PROXY 3 VIA FW 3 |
| TRANSFER PATH OF LB 2 | ·TRANSMIT ADDRESSED TO PROXY 1 VIA FW 2<br>·TRANSMIT ADDRESSED TO PROXY 2 VIA FW 3<br>·TRANSMIT ADDRESSED TO PROXY 3 VIA FW 4 | ·TRANSMIT ADDRESSED TO PROXY 1 VIA FW 3<br>·TRANSMIT ADDRESSED TO PROXY 2 VIA FW 4<br>·TRANSMIT ADDRESSED TO PROXY 3 VIA FW 5 |
| TRANSFER PATH OF FW 1 | ·TRANSMIT ADDRESSED TO PROXY 1 VIA IDS 1 | ·TRANSMIT ADDRESSED TO PROXY 1 VIA IDS 1 |
| TRANSFER PATH OF FW 2 | ·TRANSMIT ADDRESSED TO PROXY 1 VIA IDS 1<br>·TRANSMIT ADDRESSED TO PROXY 2 VIA IDS 2 | ·TRANSMIT ADDRESSED TO PROXY 2 VIA IDS 2 |
| TRANSFER PATH OF FW 3 | ·TRANSMIT ADDRESSED TO PROXY 2 VIA IDS 2<br>·TRANSMIT ADDRESSED TO PROXY 3 VIA IDS 3 | ·TRANSMIT ADDRESSED TO PROXY 1 VIA IDS 1<br>·TRANSMIT ADDRESSED TO PROXY 3 VIA IDS 3 |
| TRANSFER PATH OF FW 4 | ·TRANSMIT ADDRESSED TO PROXY 3 VIA IDS 3 | ·TRANSMIT ADDRESSED TO PROXY 2 VIA IDS 2 |
| TRANSFER PATH OF FW 5 | N/A | ·TRANSMIT ADDRESSED TO PROXY 3 VIA IDS 3 |
| TRANSFER PATH OF IDS 1 | ·TRANSMIT ADDRESSED TO PROXY 1 VIA PROXY 1 | ·TRANSMIT ADDRESSED TO PROXY 1 VIA PROXY 1 |
| TRANSFER PATH OF IDS 2 | ·TRANSMIT ADDRESSED TO PROXY 2 VIA PROXY 2 | ·TRANSMIT ADDRESSED TO PROXY 2 VIA PROXY 2 |
| TRANSFER PATH OF IDS 3 | ·TRANSMIT ADDRESSED TO PROXY 3 VIA PROXY 3 | ·TRANSMIT ADDRESSED TO PROXY 3 VIA PROXY 3 |

FIG.27

|  | STATE OF BEFORE DELETION OF FW 5 | STATE OF AFTER DELETION OF FW 5 |
|---|---|---|
| DISTRIBU-TION RATIO OF LB 1 | ·TRANSMIT 2/10 OF TOTAL AMOUNT OF TRAFFIC, I.E., 1/5 OF AMOUNT OF TRAFFIC RECEIVED BY LB 1, ADDRESSED TO PROXY 1<br>·TRANSMIT 2/10 OF TOTAL AMOUNT OF TRAFFIC, I.E., 1/5 OF AMOUNT OF TRAFFIC RECEIVED BY LB 1, ADDRESSED TO PROXY 2<br>·TRANSMIT 1/10 OF TOTAL AMOUNT OF TRAFFIC, I.E., 1/10 OF AMOUNT OF TRAFFIC RECEIVED BY LB 1, ADDRESSED TO PROXY 3 | ·TRANSMIT 2/8 OF TOTAL AMOUNT OF TRAFFIC, I.E., 1/4 OF AMOUNT OF TRAFFIC RECEIVED BY LB 1, ADDRESSED TO PROXY 1 VIA FW 1<br>·TRANSMIT 1/8 OF TOTAL AMOUNT OF TRAFFIC, I.E., 1/8 OF AMOUNT OF TRAFFIC RECEIVED BY LB 1, ADDRESSED TO PROXY 2 VIA FW 2<br>·TRANSMIT 1/8 OF TOTAL AMOUNT OF TRAFFIC, I.E., 1/8 OF AMOUNT OF TRAFFIC RECEIVED BY LB 1, ADDRESSED TO PROXY 3 VIA FW 3 |
| DISTRIBU-TION RATIO OF LB 2 | ·TRANSMIT 1/10 OF TOTAL AMOUNT OF TRAFFIC, I.E., 1/10 OF AMOUNT OF TRAFFIC RECEIVED BY LB 2, ADDRESSED TO PROXY 1<br>·TRANSMIT 2/10 OF TOTAL AMOUNT OF TRAFFIC, I.E., 1/5 OF AMOUNT OF TRAFFIC RECEIVED BY LB 2, ADDRESSED TO PROXY 2<br>·TRANSMIT 2/10 OF TOTAL AMOUNT OF TRAFFIC, I.E., 1/5 OF AMOUNT OF TRAFFIC RECEIVED BY LB 2, ADDRESSED TO PROXY 3 | ·TRANSMIT 1/8 OF TOTAL AMOUNT OF TRAFFIC, I.E., 1/8 OF AMOUNT OF TRAFFIC RECEIVED BY LB 2, ADDRESSED TO PROXY 1 VIA FW 2<br>·TRANSMIT 1/8 OF TOTAL AMOUNT OF TRAFFIC, I.E., 1/8 OF AMOUNT OF TRAFFIC RECEIVED BY LB 2, ADDRESSED TO PROXY 2 VIA FW 3<br>·TRANSMIT 2/8 OF TOTAL AMOUNT OF TRAFFIC, I.E., 1/4 OF AMOUNT OF TRAFFIC RECEIVED BY LB 2, ADDRESSED TO PROXY 3 VIA FW 4 |
| TRANSFER PATH OF LB 1 | ·TRANSMIT ADDRESSED TO PROXY 1 VIA FW 1<br>·TRANSMIT ADDRESSED TO PROXY 2 VIA FW 2<br>·TRANSMIT ADDRESSED TO PROXY 3 VIA FW 3 | ·TRANSMIT ADDRESSED TO PROXY 1 VIA FW 1<br>·TRANSMIT ADDRESSED TO PROXY 2 VIA FW 2<br>·TRANSMIT ADDRESSED TO PROXY 3 VIA FW 3 |
| TRANSFER PATH OF LB 2 | ·TRANSMIT ADDRESSED TO PROXY 1 VIA FW 3<br>·TRANSMIT ADDRESSED TO PROXY 2 VIA FW 4<br>·TRANSMIT ADDRESSED TO PROXY 3 VIA FW 5 | ·TRANSMIT ADDRESSED TO PROXY 1 VIA FW 2<br>·TRANSMIT ADDRESSED TO PROXY 2 VIA FW 3<br>·TRANSMIT ADDRESSED TO PROXY 3 VIA FW 4 |
| TRANSFER PATH OF FW 1 | ·TRANSMIT ADDRESSED TO PROXY 1 VIA IDS 1 | ·TRANSMIT ADDRESSED TO PROXY 1 VIA IDS 1 |
| TRANSFER PATH OF FW 2 | ·TRANSMIT ADDRESSED TO PROXY 2 VIA IDS 2 | ·TRANSMIT ADDRESSED TO PROXY 1 VIA IDS 1<br>·TRANSMIT ADDRESSED TO PROXY 2 VIA IDS 2 |
| TRANSFER PATH OF FW 3 | ·TRANSMIT ADDRESSED TO PROXY 1 VIA IDS 1<br>·TRANSMIT ADDRESSED TO PROXY 3 VIA IDS 3 | ·TRANSMIT ADDRESSED TO PROXY 2 VIA IDS 2<br>·TRANSMIT ADDRESSED TO PROXY 3 VIA IDS 3 |
| TRANSFER PATH OF FW 4 | ·TRANSMIT ADDRESSED TO PROXY 2 VIA IDS 2 | ·TRANSMIT ADDRESSED TO PROXY 3 VIA IDS 3 |
| TRANSFER PATH OF FW 5 | ·TRANSMIT ADDRESSED TO PROXY 3 VIA IDS 3 | N/A |
| TRANSFER PATH OF IDS 1 | ·TRANSMIT ADDRESSED TO PROXY 1 VIA PROXY 1 | ·TRANSMIT ADDRESSED TO PROXY 1 VIA PROXY 1 |
| TRANSFER PATH OF IDS 2 | ·TRANSMIT ADDRESSED TO PROXY 2 VIA PROXY 2 | ·TRANSMIT ADDRESSED TO PROXY 2 VIA PROXY 2 |
| TRANSFER PATH OF IDS 3 | ·TRANSMIT ADDRESSED TO PROXY 3 VIA PROXY 3 | ·TRANSMIT ADDRESSED TO PROXY 3 VIA PROXY 3 |

SETTING METHOD, SERVER DEVICE AND SERVICE CHAIN SYSTEM

CROSS-REFERENCE TO RELATED APPLICATION

This application is based upon and claims the benefit of priority of the prior Japanese Patent Application No. 2015-188947, filed on Sep. 25, 2015, and the priority of the prior Japanese Patent Application No. 2016-160310, filed on Aug. 18, 2016, the entire contents of which are incorporated herein by reference.

FIELD

The embodiments discussed herein are directed to a setting method, server device and a service chain system.

BACKGROUND

In a most recent network, there is a service chain system in which, when an access is performed from the base location to an external site or when an access is performed from the base location to another base location, network (NW) functions, such as functions of a firewall (FW), a Proxy, and the like, are virtually arranged on communication paths in accordance with a request and then packets are transferred. A communication path passing through virtual NW functions is referred to as a service chain.

Conventionally, a NW function is operated in a physical NW device, such as a NW server, or the like. However, due to an improvement of the performance of recent general-purpose servers, the NW function is operated even in a software process in a general-purpose server. Accordingly, an operation of the NW function is started in the configuration in which a program of the NW function is operated in a virtual machine in a virtual environment of the general-purpose server. Furthermore, the software process related to a NW that is operated in a virtual machine is referred to as a virtual network function (virtual NW function: VNF).

However, the operation mode of a process related to a NW, such as data transfer or the like, is shifted from a physical NW device to a VNF that is performed by the software process in the general-purpose server and, consequently, a state of a decrease in the process performance of the data transfer occurs. Thus, by executing a plurality of programs in parallel, by operating and scaling out virtual machines in parallel in a plurality of servers, the load of data transfer is distributed and the process performance of the data transfer is improved.

FIG. 30 is a schematic diagram illustrating an example of the arrangement configuration of a service chain. A service chain 200 illustrated in FIG. 30 arranges, for example, each of VNFs 201, such as FWs 201A, Intrusive Detection Systems (IDSs) 201B, Proxies 201C, and the like. Furthermore, the service chain 200 arranges Load Balancers (LB) 202 that distribute the traffic load to each of the VNFs 201 in a previous stage. The LBs 202 distribute the load (traffic) to each of the VNFs 201 arranged in the next stage. Consequently, by distributing the load applied to the transfer process of each of the VNFs 201, a decrease in the process performance due to software implementation is suppressed.

Patent Document 1: Japanese Laid-open Patent Publication No. 2014-225157

Patent Document 2: Japanese Laid-open Patent Publication No. 2014-21854

However, in the VNFs 201 that constitute the service chain 200, the LB 202 is needed for each of the VNFs 201 and thus a transfer delay occurs every time a process passes each of the LBs 202. Furthermore, because the service chain 200 needs a lot of the LBs 202, the resources in the virtual area in the general-purpose servers are consequently used.

SUMMARY

According to an aspect of the embodiments, a setting method is implemented by a server device. The setting method includes first deciding, second deciding and setting. The first deciding decides, when virtual communication function groups are arranged in a plurality of stages in a virtual area, a virtual distributed function that is to be arranged in the previous stage of the virtual communication function group that is in a first stage of the plurality of stages. The second deciding decides a communication path based on a load from the virtual distributed function to each of the virtual communication functions in a terminal virtual communication function group from among the plurality stages of the virtual communication function groups. The setting sets the decided communication path to the virtual distributed function and each of the virtual communication functions arranged in the virtual area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic diagram illustrating an example of the format of a configuration request;

FIG. 23 is a schematic diagram illustrating an example of the distribution ratio of the aggregation LBs and a transfer path of each of the VNFs of before and after the addition of the FW 5;

FIG. 27 is a schematic diagram illustrating an example of the distribution ratio of the aggregation LBs and a transfer path of each of the VNFs of before and after the deletion of the FW 5;

DESCRIPTION OF EMBODIMENTS

Preferred embodiments of the present invention will be explained with reference to accompanying drawings. The disclosed technology is not limited to the embodiment. Furthermore, the embodiments described below may also be appropriately used in combination as long as processes do not conflict with each other.

Figure 1:
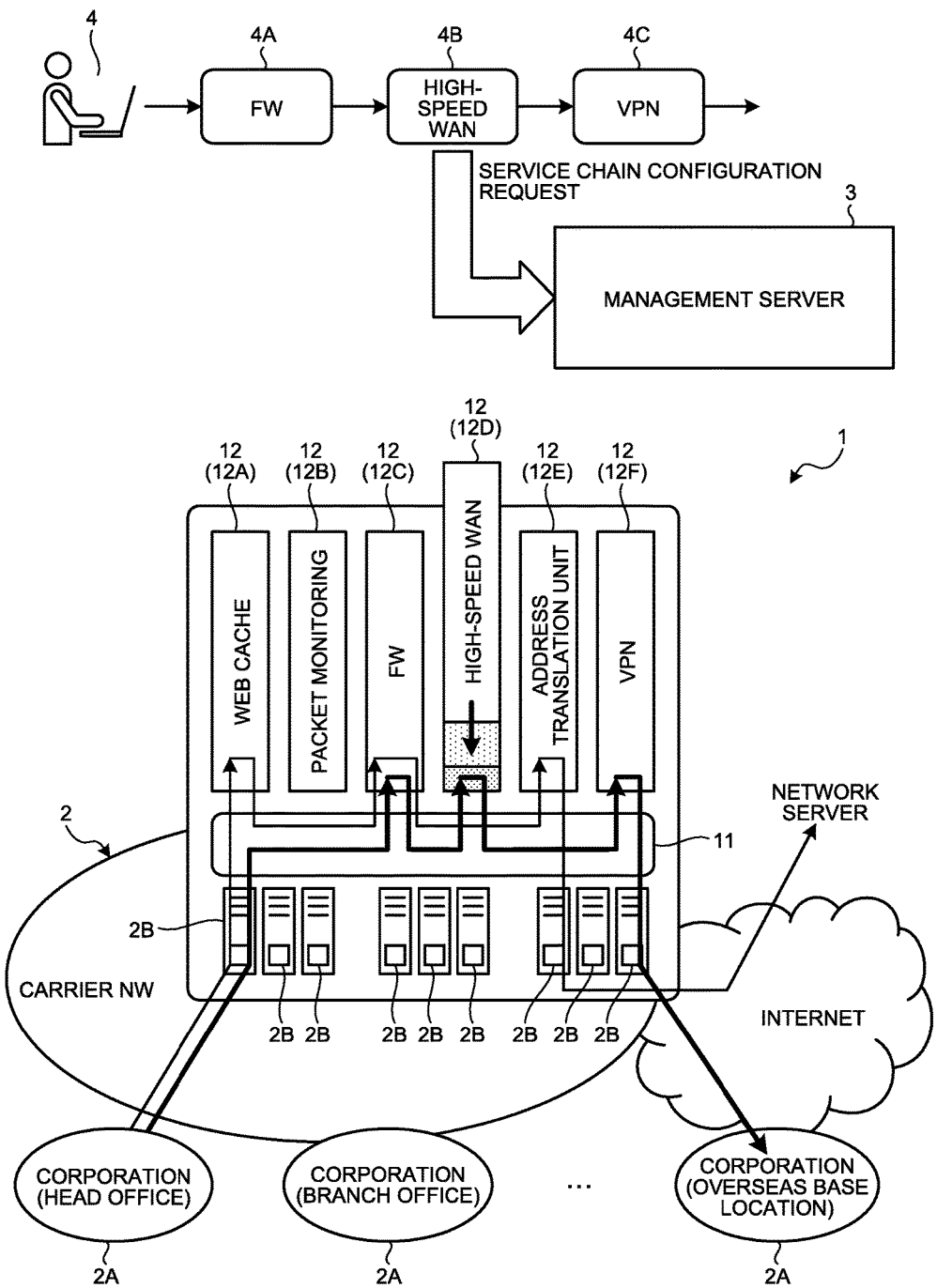
FIG. 1 is a schematic diagram illustrating an example of a service chain system according to an embodiment.

FIG. 1 is a schematic diagram illustrating an example of a service chain system according to an embodiment. A service chain system 1 illustrated in FIG. 1 includes a carrier NW 2, a management server 3, and a terminal device 4. The carrier NW 2 is a NW that is connected to, for example, the head office of a corporation, base locations 2A, such as branch offices, overseas base locations, or the like. The carrier NW 2 is constituted by, for example, a plurality of general-purpose servers 2B and includes a virtual NW 11 that is operated in a virtual area in a resource area of each of the general-purpose servers 2B and a plurality of VNFs 12 arranged in the virtual NW 11. The management server 3 establishes, in a virtual area, the service chain in which communication is performed between the base locations 2A.

Each of the VNFs 12 is, for example, a virtual NW function, such as a Web cache 12A, a packet monitoring 12B, a FW 12C, a high-speed WAN 12D, an address translation unit 12E, a VPN 12F, an IDS, a Proxy, and the like. The Web cache 12A is a NW function that stores cache data with a Web server that is not illustrated. The packet monitoring 12B is a NW function that monitors the state of the packet in a communication path. The FW 12C is a NW function that prevents an unauthorized access. The high-speed WAN 12D is a NW function, such as a high-speed WAN or the like. The address translation unit 12E is a NW function that translates addresses. The VPN 12F is a NW function, such as a virtual private network or the like. The IDS is a NW function that detects an illegal intrusion from the outside. The Proxy is a NW function of a proxy server. The VNFs 12 are virtual communication functions that are virtually arranged in the virtual area in the general-purpose server 2B.

The management server 3 is a server device that arranges, in accordance with a configuration request of the service chain received from the terminal device 4, the desired virtual NW 11 and the VNFs 12 in the virtual area of each of the general-purpose servers 2B in the carrier NW 2. The terminal device 4 is a terminal device of, for example, a system administrator or the like, that is connected to the management server 3 via, for example, a FW 4A, a high-speed WAN 4B, a VPN 4C, or the like and that instructs the management server 3 about a configuration request of the service chain. Furthermore, the configuration request is a command to request the arrangement of one or a plurality of VNFs 12 in a communication path that is used for the packet transfer. Furthermore, in some cases, the configuration request sometimes designates, in addition to designating the number of instances of the VNF 12 and the LB 13, only the number of instances of the VNF 12. Furthermore, in some cases, the configuration request sometimes designates, for example, the request quality of the service chain. If the management server 3 detects a configuration request in which the request quality is designated, the management server 3 decides the number of instances of the VNF 12 or the LB 13 on the basis of the desired function that is designated by the configuration request.

Figure 2:
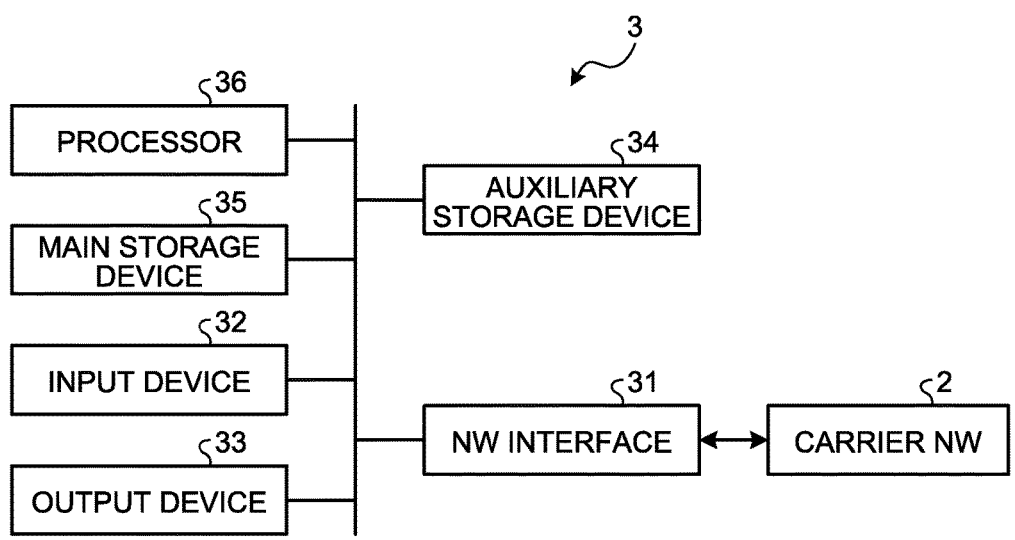
FIG. 2 is a schematic diagram illustrating an example of the hardware configuration of a management server.

FIG. 2 is a schematic diagram illustrating an example of the hardware configuration of the management server 3. The management server 3 illustrated in FIG. 2 corresponds to, for example, a dedicated purpose computer or a general purpose computer as a NW server. The management server 3 includes a NW interface 31, an input device 32, an output device 33, an auxiliary storage device 34, a main storage device 35, and a processor 36. The NW interface 31 is a communication interface that is connected to the NW carrier 2 and that is connected to the VPN 12F. Furthermore, the NW interface 31 is a communication interface that manages, for example, wired or wireless communication. The NW interface 31 is a communication card, such as a network interface card (NIC), a local area network (LAN) card, or the like.

The input device 32 is an input interface, such as a pointing device including, for example, a keyboard, a mouse, or the like, that inputs various kinds of information. The output device 33 is an output interface, such as an audio output device, a display device, and the like, that outputs various kinds of information. The auxiliary storage device 34 is a nonvolatile memory, such as an Erasable Programmable ROM (EPROM), a hard disk drive, or the like, that stores therein, for example, various kinds programs or various kinds of information, such as data or the like, that are used by the processor 36. Furthermore, the auxiliary storage device 34 is an area that stores therein, for example, an operating system (OS) or the other various kinds of application programs.

The main storage device 35 is a semiconductor memory, such as a random access memory (RAM), or the like, that provides an area in which various kinds of information, for example, the program stored in the auxiliary storage device 34 is loaded or that provides a work area. The processor 36 is a control unit, such as a central processing unit (CPU), or the like that controls the entirety of the management server 3. The processor 36 executes various kinds of processing functions by loading, in the main storage device 35, the OS or various application programs stored in the auxiliary storage device 34 or a portable recording medium. The number of the processors 36 is not limited to one and a plurality number of the processors 36 may also be provided.

Figure 3:
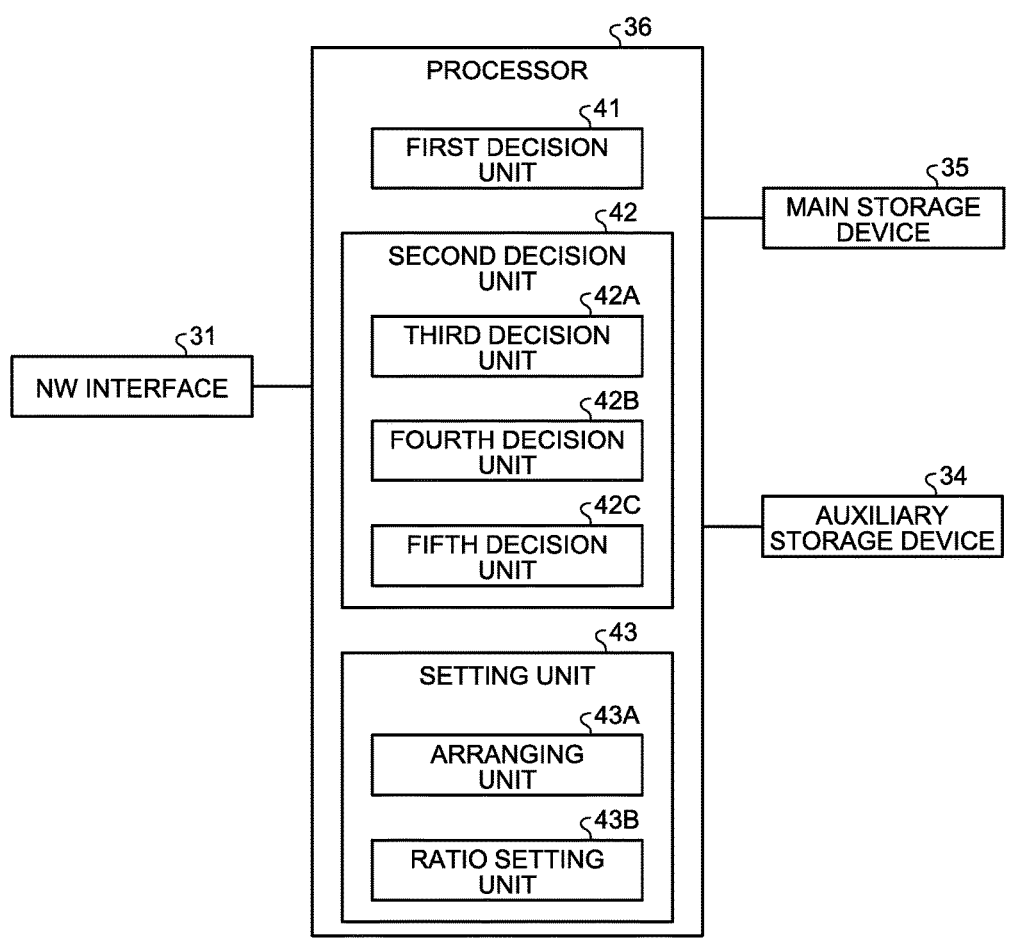
FIG. 3 is a schematic diagram illustrating an example of the functional configuration of a processor in the management server.

FIG. 3 is a schematic diagram illustrating an example of the functional configuration of the processor 36 in the management server. The processor 36 reads the program stored in the auxiliary storage device 34 and executes the read program, whereby the processor 36 includes a first decision unit 41, a second decision unit 42, and a setting unit 43 as the functional configuration.

Figure 5:
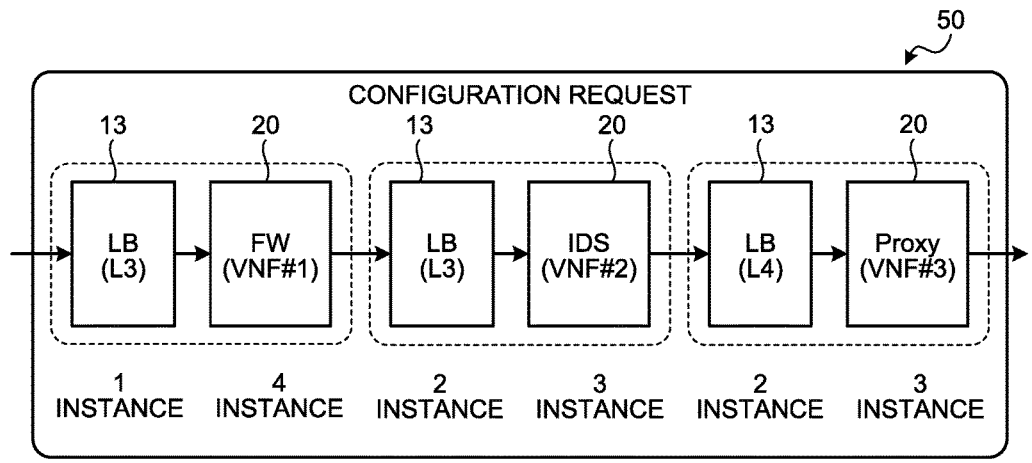
FIG. 5 is a schematic diagram illustrating an example of the arrangement configuration of the configuration request before LB aggregation.

FIG. 4 is a schematic diagram illustrating an example of the format of configuration request and FIG. 5 is a schematic diagram illustrating an example of the arrangement configuration of the configuration request before LB aggregation. The configuration request 50 is a command, from the terminal device 4 to the management server 3, to request to construct a service chain. Furthermore, the configuration request 50 illustrated in FIG. 4 includes, as illustrated in FIG. 5, the type of VNF groups 20 with the three types #1 to #3, the number of instances in VNFs 12 for each of the VNF groups 20, the type of LB groups 21 with the three types that are set in the VNF groups 20, and the number of instances in the LBs 13 for each of the LB groups 21. Furthermore, for convenience of description, the VNF group 20 with the type of #1 is referred to as a "VNF #1", the VNF group 20 with the type of #2 is referred to as a "VNF #2", and the VNF group 20 with the type of #3 is referred to as a "VNF #3".

The configuration request 50 includes a message type 51, a request VNF count 52, a VNF #1 LB type 53A, a VNF #1 LB instance count 54A, a VNF #1 type 55A, and a VNF #1 instance count 56A. Furthermore, the configuration request 50 includes a VNF #2 LB type 53B, a VNF #2 LB instance count 54B, a VNF #2 type 55B, and a VNF #2 instance count 56B. Furthermore, the configuration request 50 includes a VNF #3 LB type 53C, a VNF #3 LB instance count 54C, a VNF #3 type 55C, a VNF #3 instance count 56C, a transmission source address 57, and a destination address 58.

The message type 51 is the information for identifying the message type of the configuration request 50 and is, for example, a "service chain configuration request". The request VNF count 52 is the sum total of the LB types and the VNF types in the configuration request 50 and is assumed to be, for example, "6", i.e., for example, the VNF #1, the LB 13 in the VNF #1, the VNF #2, the LB 13 in the VNF #2, the VNF #3, and the LB 13 in the VNF #3. The VNF #1 LB type 53A is the information for identifying the type of the LB 13 that is arranged in the previous stage of the VNF #1 and is assumed to be, for example, an "L3 level LB" at the level L3. The VNF #1 LB instance count 54A corresponds to the number of LBs 13 requested to be arranged in the previous stage of the VNF #1 and is assumed to be, for example, "1". The VNF #1 type 55A is the information for identifying the type of the VNF #1 that is requested to be arranged and is assumed to be, for example, a "PFW". The VNF #1 instance count 56A corresponds to the number of VNFs 12 in the VNF #1 requested to be arranged and is assumed to be, for example, "4".

The VNF #2 LB type 53B is the information for identifying the type of the LB 13 that is to be arranged in the previous stage of the VNF #2 and is assumed to be, for example, an "L4 level LB". The VNF #2 LB instance count 54B corresponds to the number of LBs 13 requested to be arranged in the previous stage of the VNF #2 and is assumed to be, for example, "2". The VNF #2 type 55B is the information for identifying the type of the VNF #2 requested to be arranged and is assumed to be, for example, an "IDS". The VNF #2 instance count 56B corresponds to the number of VNFs 12 in the VNF #2 requested to be arranged and is assumed to be, for example, "3".

The VNF #3 LB type 53C is the information for identifying the type of the LB 13 that is to be arranged in the previous stage of the VNF #3 and is assumed to be, for example, an "L4 level LB". The VNF #3 LB instance count 54C corresponds to the number of LBs 13 requested to be arranged in the previous stage of the VNF #3 and is assumed to be, for example, "2". The VNP #3 type 55C is the information for identifying the type of the VNF #3 that is requested to be arranged and is assumed to be, for example, a "Proxy". The VNF #3 instance count 56C corresponds to the number of VNFs 12 in the VNF #3 requested to be arranged and is assumed to be, for example, "3". The transmission source address 57 is the transmission source address of communication that uses the service chain related to the configuration request 50. The destination address 58 is the destination address of communication that uses the service chain related to the configuration request 50.

When the first decision unit 41 detects the configuration request 50 illustrated in FIG. 5, the first decision unit 41 decides, on the basis of the number of instances in the VNFs 12 in each of the VNF groups 20 designated in the configuration request 50, the number of the aggregation LBs 13A that are to be arranged in the VNF group 20 in the first stage, i.e., in the previous stage of the VNF #1, from among the predetermined order. Furthermore, the predetermined order is the order of the arrangements of, for example, the VNF #1 (FW), the VNF #2 (IDS), and the VNF #3 (Proxy) starting from the previous stage.

When the first decision unit 41 detects the configuration request 50 illustrated in FIG. 5, the first decision unit 41 specifies, on the basis of the configuration request 50, the LB group 21 (LB (L4) with respect to the VNF #3) with a higher layer "L4 level" from among the characteristics of the LBs 13 that distribute the traffic to the VNF groups 20. Furthermore, the distribution process performed in units of the L4 level (TCP session) can perform the distribution process in units of the L3 level (IP). Furthermore, the first decision unit 41 specifies the LB 13 (i.e., the LB(L4) with respect to the VNF #3) with the maximum number of LB instances in the LB group 21 that executes the distribution process with the higher layer "L4 level" and decides that the number of the subject LB instances is the number of instances in the aggregation LB 13A. Namely, because the number of LB instances in the VNF #3 is two at the L4 level LB, the first decision unit 41 decides the two at the L4 level LB as the aggregation LB 13A. Furthermore, the reason for specifying the VNF group 20 at the L4 level is that the process in units of the L4 level (TCP session) can also perform the process in units of the L3 level (IP).

Figure 6:
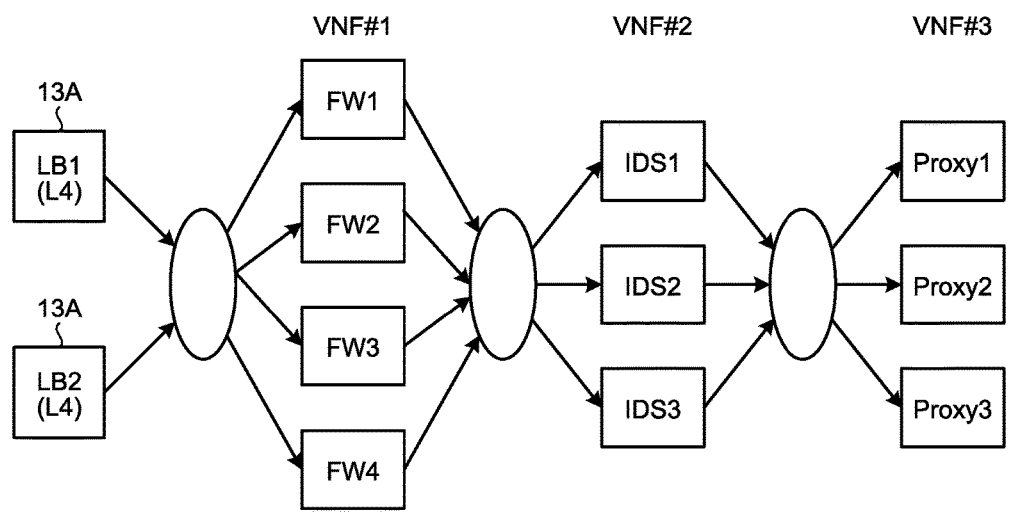
FIG. 6 is a schematic diagram illustrating an example of the topology configuration related to the configuration request illustrated in FIG. 5.

Furthermore, the first decision unit 41 decides the topology configuration as the arrangement order of the VNF #1, the VNF #2, and the VNF #3. FIG. 6 is a schematic diagram illustrating an example of the topology configuration related to the configuration request illustrated in FIG. 5. As illustrated in FIG. 6, the first decision unit 41 decides the topology configuration by arranging the VNF #1 in the first stage of the service chain, the VNF #2 in the next stage of the VNF #1, and the VNF #3 in the next stage of the VNF #2 and, furthermore, arranging the aggregation LB 13A in the previous stage of the VNF #1 that is in the first stage.

The topology configuration illustrated in FIG. 6 is the configuration in which the LB 1 and the LB 2 included in the aggregation LB 13A are arranged in the first stage, the FW 1 to the FW 4 included in the VNF #1 is arranged in the next stage, the IDS 1 to IDS 3 included in the VNF #2 is arranged in the next stage of the VNF #1, and the Proxy 1 to the Proxy 3 included in the VNF #3 in the next stage of the VNF #2.

The second decision unit 42 decides the distribution ratio of the load (traffic) of the aggregation LB 13A and the load ratio (traffic ratio) of the VNF 12, where the load (traffic) from the aggregation LB 13A to each of the VNFs 12 in the terminal VNF group 20 from among the plurality of the VNF groups 2 is distributed. The second decision unit 42 includes a third decision unit 42A, a fourth decision unit 42B, and a fifth decision unit 42C.

Figure 7:
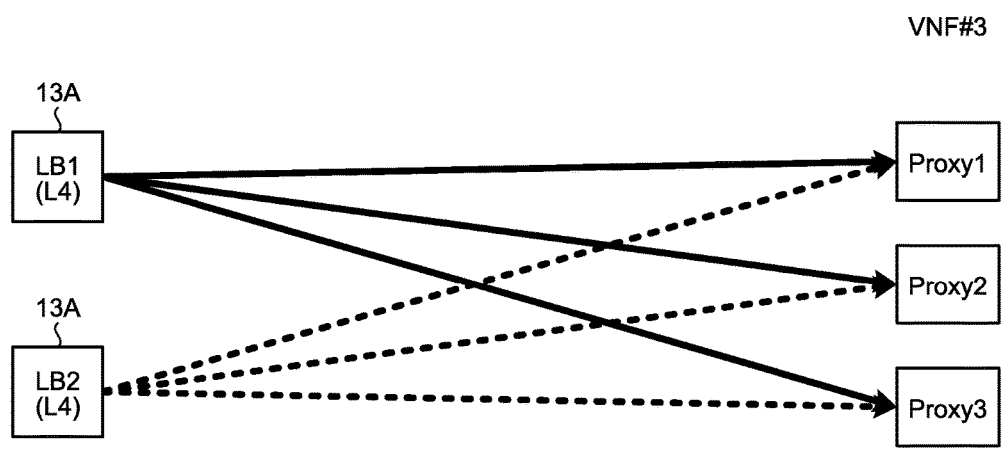
FIG. 7 is a schematic diagram illustrating an example of the terminal destination related to the configuration request illustrated in FIG. 5.

FIG. 7 is a schematic diagram illustrating an example of the terminal destination related to the configuration request 50 illustrated in FIG. 5. The third decision unit 42A decides the VNFs 12 included in the VNF group 20 that corresponds to the terminal from among the plurality of the VNF groups 20 and also decides optimal paths from the aggregation LB 13A to each of the terminal VNFs 12.

Because the aggregation LB 13A is the LB at the L4 level, the third decision unit 42A decides, as illustrated in FIG. 7, for example, the Proxy 1 to the Proxy 3 in the VNF #3 as the terminal VNFs 12, where the L4 level is terminated from the aggregation LB 13A. The "LB 1" in the aggregation LB 13A decides the three paths for the Proxy 1 to the Proxy 3.

Furthermore, the "LB 2" in the aggregation LB 13A also decides the three paths for the Proxy 1 to the Proxy 3.

Figure 8:
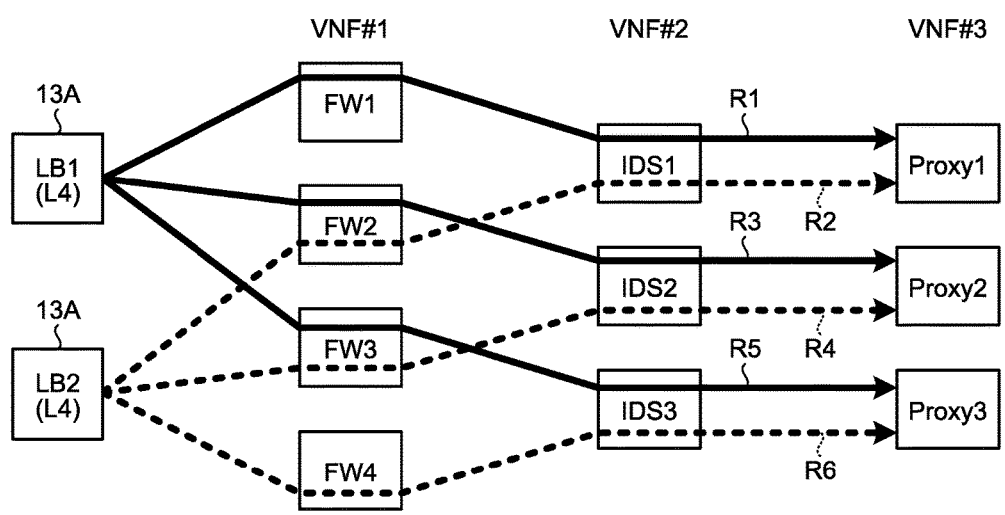
FIG. 8 is a schematic diagram illustrating an example of optimal paths related to the configuration request illustrated in FIG. 5.

FIG. 8 is a schematic diagram illustrating an example of optimal paths related to the configuration request 50 illustrated in FIG. 5. The third decision unit 42A performs the shortest path calculation on the three paths from the "LB 1" in the aggregation LB 13A to the terminal VNFs 12, i.e., to the Proxy 1 to the Proxy 3 by increasing a link cost on a calculated path in a shortest path cost method, such as the Dijkstra's algorithm or the like, whereby the third decision unit 42A decides the optimal paths R1, R3, and R5 that are distributed paths passing through the VNF #1 and the VNF #2. The third decision unit 42A uses the shortest path cost method and performs link cost addition on the three paths from the "LB 2" in the aggregation LB 13A to the terminal VNFs, i.e., to the Proxy 1 to the Proxy 3, whereby the third decision unit 42A decides the optimal paths R2, R4, and R6 that are distributed paths passing through the VNF #1 and the VNF #2.

The fourth decision unit 42B decides the distribution ratio of the load (traffic amount) from the aggregation LB 13A to each of the VNFs 12 in the first stage such that an amount of load (traffic) of each of the VNFs 12 in the VNF group 20 the maximum number of instances in the VNF 12 from among the VNF groups 20 arranged in each of the optimal paths R1 to R6.

Figure 9:
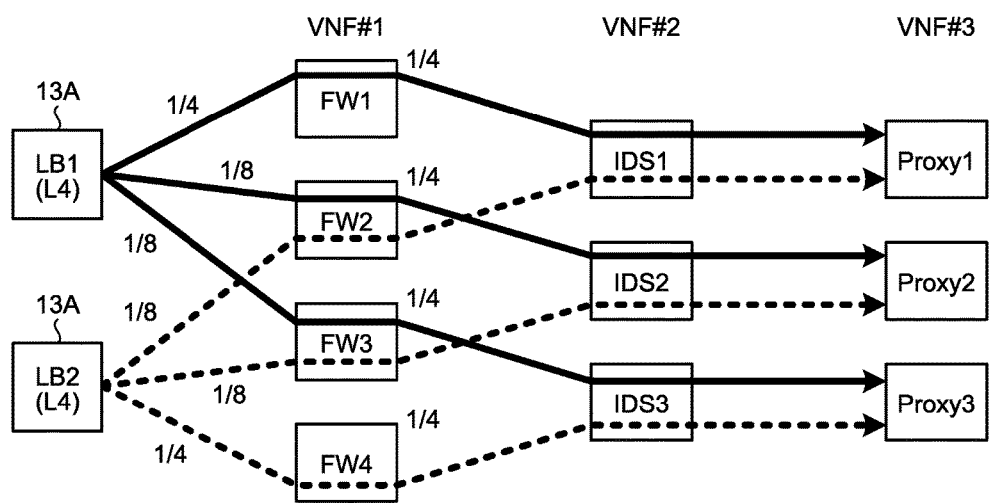
FIG. 9 is a schematic diagram illustrating an example of the distribution ratio of the aggregation LB related to the configuration request illustrated in FIG. 5.

FIG. 9 is a schematic diagram illustrating an example of the distribution ratio of the aggregation LB 13A related to the configuration request 50 illustrated in FIG. 5. The fourth decision unit 42B specifies, from among the VNF #1 to the VNF #3, the VNF 12 with the maximum number, i.e., the VNFs #1 (the FW 1 to the FW 4). The fourth decision unit 42B calculates the distribution ratio that is distributed from the "LB 1" and the "LB 2" in the aggregation LB 13A to the FW 1 to the FW 4 included in the VNF #1 such that the amount of load (traffic) of the FW 1 to the FW 4 in the VNF #1 is equal from among the six optimal paths. For example, if the amount of load (traffic) of the entirety of the service chain is set to "1", the distribution ratio from the LB 1 to the FW 1 is 1/4 of the entirety of the amount of the traffic, the distribution ratio from the LB 1 to the FW 2 is 1/8 of the entirety of the amount of the traffic, and the distribution ratio from the LB 1 to the FW 3 is 1/8 of the entirety of the amount of the traffic. Furthermore, the distribution ratio from the LB 2 to the FW 4 is 1/4 of the entirety of the amount of the traffic, the distribution ratio from the LB 2 to the FW 2 is 1/8 of the entirety of the amount of the traffic, and the distribution ratio from the LB 2 to the FW 3 is 1/8 of the entirety of the amount of the traffic. Consequently, an amount of load (traffic) of 1/4 is equally allocated to each of the FW 1 to the FW 4.

Figure 10:
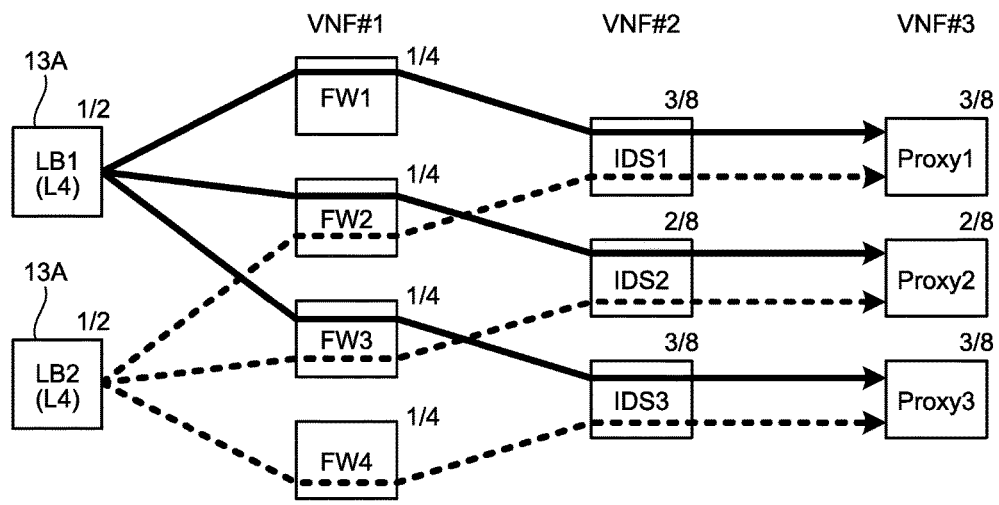
FIG. 10 is a schematic diagram illustrating an example of the traffic ratio of VNF related to the configuration request illustrated in FIG. 5.

The fifth decision unit 42C calculates the traffic ratio from each of the VNFs 12 to the VNF 12 that is in the next stage such that the traffic ratio of the amount of load applied to each of the VNFs 12 is optimal for each optimal path. FIG. 10 is a schematic diagram illustrating an example of the traffic ratio of VNF 12 related to the configuration request 50 illustrated in FIG. 5. After the fifth decision unit 42C decides the distribution ratio of the load applied from the "LB 1" and the "LB 2" in the aggregation LB 13A to each of the FW 1 to the FW 4 included in the VNFs #1, the fifth decision unit 42C decides the transfer paths for the optimal paths R1 to R6 and decides the distribution ratio of each of the VNFs 12 on the respective transfer paths. The transfer path is the path, from among the optimal paths, that is used by the VNF 12 to transfer a packet to the VNF 12 that is in the next stage.

The transfer paths of the "LB 1" in the aggregation LB 13A are the path that transfers the packet addressed to the Proxy 1 to the FW 1, the path that transfers the packet addressed to the Proxy 2 to the FW 2, and the path that transfers the packet addressed to the Proxy 3 to the FW 3. The transfer paths of the "LB 2" of the aggregation LB 13A are the path that transfers the packet addressed to the Proxy 1 to the FW 2, the path that transfers the packet addressed to the Proxy 2 to the FW 3, and the path that transfers the packet addressed to the Proxy 3 to the FW 4.

Furthermore, the transfer path of the FW 1 is the path that transfers the packet addressed to the Proxy 1 to the IDS 1. The transfer path of the FW 2 is the path that transfers the packet addressed to the Proxy 1 to the IDS 1 and the path that transfers the packet addressed to the Proxy 2 to the IDS 2. The transfer path of the FW 3 is the path that transfers the packet addressed to the Proxy 2 to the IDS 2 and the path that transfers the packet addressed to the Proxy 3 to the IDS 3. The transfer path of the FW 4 is the path that transfers the packet addressed to the Proxy 3 to the IDS 3.

Furthermore, the transfer path of the IDS 1 is the path that transfers the packet addressed to the Proxy 1 to the Proxy 1. The transfer path of the IDS 2 is the path that transfers the packet addressed to the Proxy 2 to the Proxy 2. The transfer path of the IDS 3 is the path that transfers the packet addressed to the Proxy 3 to the Proxy 3.

Furthermore, the fifth decision unit 42C decides the load ratio (traffic ratio) of each of the VNFs 12 such that an amount of load of each of the VNFs 12 in each of the transfer paths is optimal. The traffic ratio of each of the VNFs 12 is calculated by, for example, a Weighted Round Robin method, a weighted HASH distribution method, or the like.

The fifth decision unit 42C decides the traffic ratio (traffic ratio) for each transfer path from the VNF #1 to the VNF #2. For example, the traffic ratio of the transfer path from the FW 1 to the IDS 1 is 2/8, the traffic ratio of the transfer path from the FW 2 to the IDS 1 is 1/8, and the traffic ratio of the transfer path from the FW 2 to the IDS 2 is 1/8. Furthermore, the traffic ratio of the transfer path from the FW 3 to the IDS 2 is 1/8, the traffic ratio of the transfer path from the FW 3 to the IDS 3 is 1/8, and the traffic ratio of the transfer path from the FW 4 to the IDS 3 is 2/8.

Furthermore, the fifth decision unit 42C decides the traffic ratio for each transfer path from the VNF #2 to the VNF #3. For example, the traffic ratio of the transfer path from the IDS 1 to the Proxy 1 is 3/8, the traffic ratio of the transfer path from the IDS 2 to the Proxy 2 is 2/8, and the traffic ratio of the transfer path from the IDS 3 to the Proxy 3 is 3/8. Furthermore, for convenience of description, the traffic ratio of the transfer path from the VNF #2 to the VNF #3 are set to, for example, 3/8, 2/8, and 3/8, respectively; however, it may also possible to adjust the traffic ratio such that the traffic ratio is equal for each transfer path.

The setting unit 43 includes an arranging unit 43A and a ratio setting unit 43B. On the basis of the number of the aggregations LB 13A and the VNFs 12 and on the basis of the optimal paths R1 to R6 and the transfer paths, the arranging unit 43A arranges the aggregation LBs 13A and the VNFs 12 in the virtual area in the general-purpose servers 2B or the like and starts up the functions.

The ratio setting unit 43B sets the distribution ratio of the aggregation LBs 13A decided by the fourth decision unit 42B to the arranged aggregation LB 13A. The ratio setting unit 43B sets the traffic ratio of each of the VNFs 12 decided by the fifth decision unit 42C to the VNF 12. Consequently, it is possible to construct a service chain of the configuration request in a virtual environment.

The management server 3 constructs, on the basis of the aggregation LB 13A, an optimal path R from the aggregation LB 13A to the terminal VNF 12, the distribution ratio of the aggregation LB 13A and the traffic ratio of each of the VNFs 12, the service chain of the configuration request in a virtual area in the specified general-purpose server 2B in the carrier NW 2.

Figure 11:
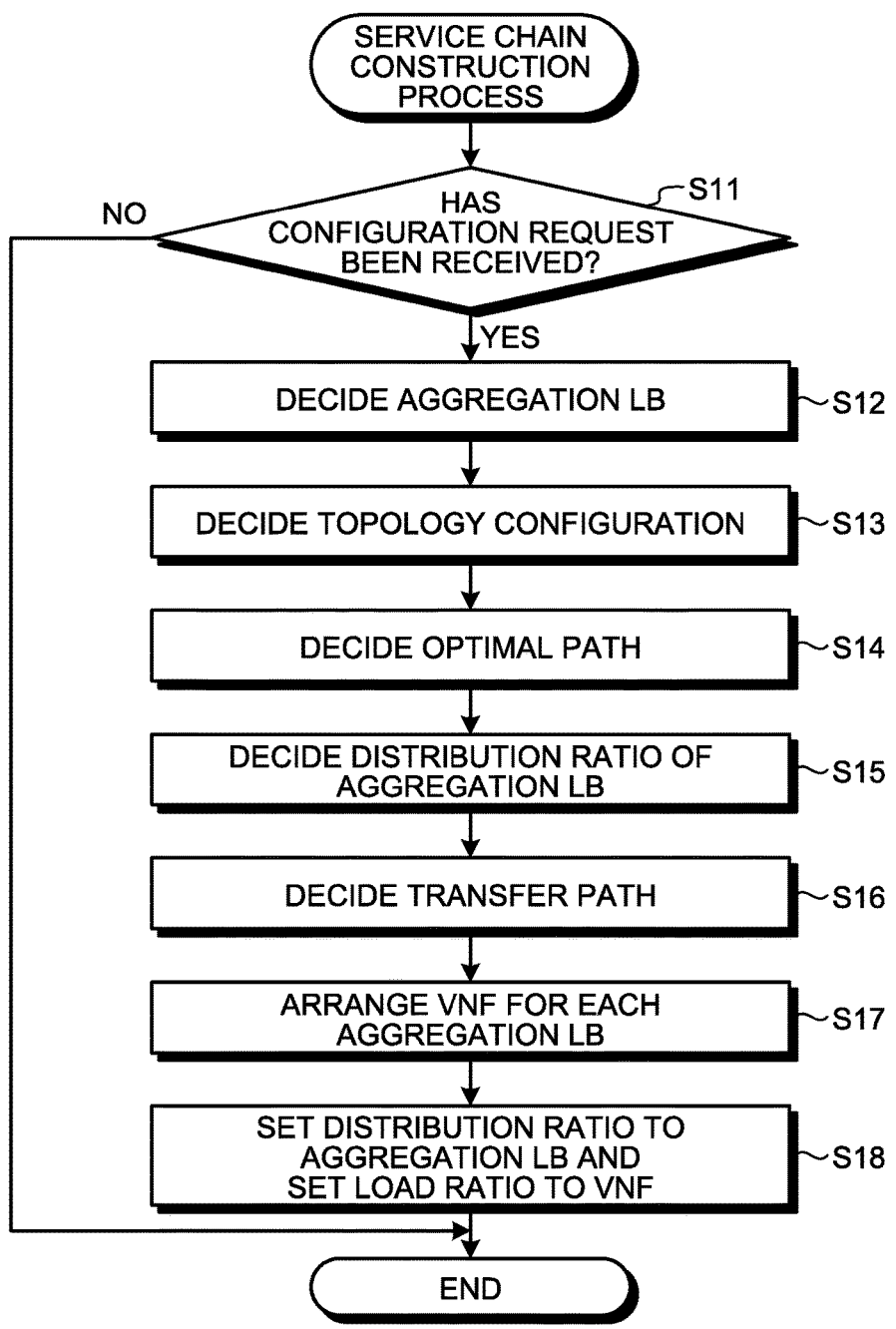
FIG. 11 is a flowchart illustrating an example of the processing operation of the management server related to a service chain construction process.

In the following, an operation of the service chain system 1 according to the embodiment will be described. FIG. 11 is a flowchart illustrating an example of the processing operation performed in the management server 3 related to a service chain construction process. The service chain construction process illustrated in FIG. 11 is a process of constructing, in accordance with a configuration request from the terminal device 4, a service chain associated with the configuration request in a virtual area.

In FIG. 11, the first decision unit 41 in the processor 36 in the management server 3 determines whether a configuration request has been received from the terminal device 4 (Step S1). If the first decision unit 41 has received the configuration request (Yes at Step S11), the first decision unit 41 decides, on the basis of the number of instances in the VNFs 12 included in the VNF group 20 included in the configuration request and on the basis of the number of instances in the LB 13 for each of the VNF groups 20, the number of the aggregation LBs 13A (Step S12). Furthermore, the first decision unit 41 specifies, in the VNF group 20 at a higher level included in the configuration request, the VNF group 20 with the maximum number of instances in the subject VNF 12 and decides that the number of LB instances in the specified VNF group 20 as the number of the aggregation LBs 13A. Furthermore, the first decision unit 41 decides, on the basis of the VNF group 20 in the configuration request, as illustrated in FIG. 6, the topology configuration of the aggregation LB 13A and the VNF group 20 (Step S13).

As illustrated in FIG. 7, the third decision unit 42A decides the VNF 12 included in the VNF group 20 that serves as the terminal from among the plurality of the VNF groups 20 and decides, as illustrated in FIG. 8, the optimal path R from the aggregation LB 13A to each of the terminal VNF group 20 (Step S14).

In order to equalized an amount of load (traffic) of each of the VNFs 12 in the VNF group 20 with the maximum number from among the VNF groups 20 that are arranged in each of the optimal paths, the fourth decision unit 42B calculates, as illustrated in FIG. 9, the distribution ratio from the aggregation LB 13A to each of the VNFs 12 the VNF groups 20 in each of the first stages (Step S15).

Furthermore, as illustrated in FIG. 10, the fifth decision unit 42C decides a transfer path for each optimal path (Step S16).

Furthermore, on the basis of the aggregation LB 13A, the VNF 12, the optimal path, and the transfer path, the arranging unit 43A arranges the aggregation LB 13A and the VNF 12 in the virtual area in the general-purpose server 2B and starts up the functions thereof (Step S17). Furthermore, the ratio setting unit 43B sets the distribution ratio of the aggregation LB 13A into the aggregation LB 13A that is in the virtual area and also sets the load ratio (traffic ratio) of each of the VNFs 12 into each of the VNFs 12 that are in the virtual area (Step S18) and ends the processing operation illustrated in FIG. 11. Consequently, it is possible to arrange the service chain that is in accordance with the configuration request in the virtual area.

In the embodiment described above, the plurality of aggregation LBs 13A are arranged in the first stage of the service chain and the distribution ratio of the aggregation LB 13A and the load ratio (traffic ratio) of each of the VNFs 12 are decided such that the amounts of load (traffic) from the aggregation LB 13A to the terminated VNFs 12 are equal. Consequently, by reducing the number of LBs 13, a transfer delay can be suppressed and it is possible to cut down the resources of finite virtual area.

Furthermore, it is conceivable to use a method that arranges a plurality of service chains of the VNFs 12 having the same configuration, arranges a single LB 13 in the first stage in each of the service chains, and distributes the amount of load (traffic) in the single LB 13. However, even if the performance of the VNFs 12, such as the performance of the FWs, the IDSs, and the Proxies, in each of the service chains is sufficient, there is a need to prepare the number of VNFs 12 corresponding to the number of increased VNFs 12 that become a bottleneck and thus a component cost is increased. In contrast, in the embodiment, because the minimum number of needed VNFs 12 is used, the component cost can also be reduced.

Figures 12, 13:
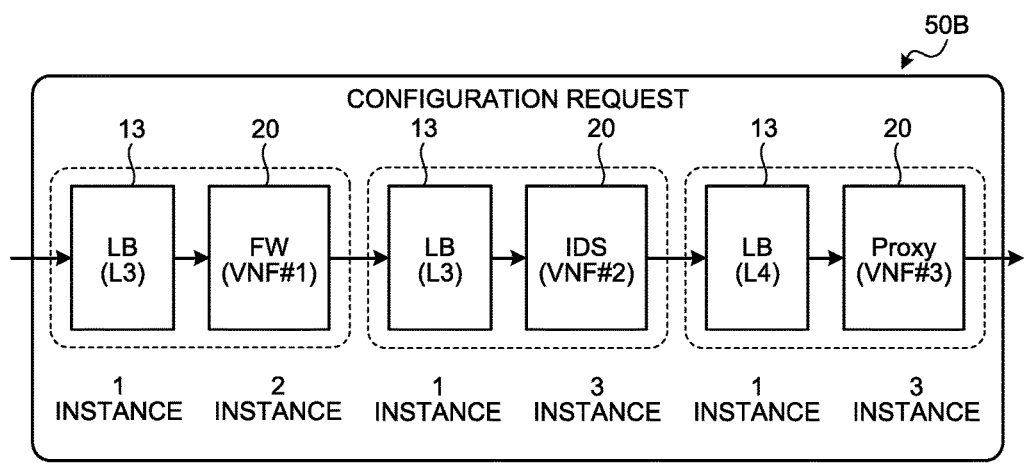
FIG. 12 is a schematic diagram illustrating an example of the format of another configuration request.
FIG. 13 is a schematic diagram illustrating an example of the arrangement configuration of another configuration request before LB aggregation.

Furthermore, in the embodiment described above, a case in which the information on the LB 13 that is used for the VNF group 20 and the VNF group 20 is exemplified as the format of the configuration request 50; however, if the single LBs 13 is used for each of the VNF groups 20, there is no need to include the information on the LB 13 to be used. FIG. 12 is a schematic diagram illustrating an example of the format of another configuration request 50A. The configuration request 50A illustrated in FIG. 12 includes the message type 51, the request VNF count 52, the VNP #1 type 55A to the VNF #3 type 55C, the VNF #1 instance count 56A to the VNF #3 instance count 56C, the transmission source address 57, and the destination address 58. Furthermore, it is assumed that the configuration request 50A does not include the information on the LB 13, such as the LB type 53 of the VNF group 20, the number of LB instances 54, and the like. Consequently, an amount of the configuration request can be made more compact.

FIG. 13 is a schematic diagram illustrating an example of the arrangement configuration of another configuration request 50B before LB aggregation. The configuration request 50B illustrated in FIG. 13 indicates that the FW in the VNF #1 is 2 instances, the LB 13 in the VNF #1 is 1 instance, the IDS in the VNF #2 is 3 instances, and the LB 13 in the VNF #2 is 1 instance. Furthermore, the configuration request 50B indicates that the Proxy in the VNF #3 is 3 instances and the LB 13 in the VNF #3 is 1 instance. Furthermore, the configuration request 50B indicates that the LB 13 in the VNF #1 is the LB 13 at the L3 level, the LB 13 in the VNF #2 is the LB 13 at the L3 level, and the LB 13 in the VNF #3 is the LB 13 at the L4 level.

When the first decision unit 41 detects the configuration request 50B illustrated in FIG. 13, the first decision unit 41 specifies, on the basis of the configuration request 50B, LB group 21 (the LB (L4) with respect to the VNF #3) at the higher layer of "L4 level" from among the characteristics of the LB 13 that distributes the traffic to the VNF groups 20. Furthermore, the first decision unit 41 specifies the LB 13 (i.e., the LB (L4) with respect to the VNF #3) in which the number of LB instances is the maximum in the LB group 21 that performs the distribution process at the higher layer "L4 level" and decides the subject number of LB instances as the number of instances in the aggregation LB 13A. Namely, because the number of LB instances in the VNF #3 is one at the L4 level LB, the first decision unit 41 decides a single LB instance at the L4 level LB as the aggregation LB 13A.

Figure 14:
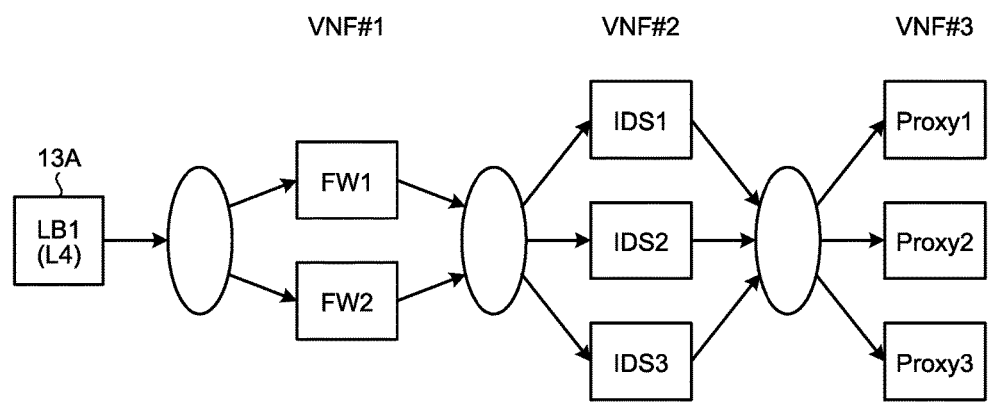
FIG. 14 is a schematic diagram illustrating an example of the topology configuration related to the configuration request illustrated in FIG. 13.

Furthermore, the first decision unit 41 decides the topology configuration as the arrangement order of the VNF #1, the VNF #2, and the VNF #3. FIG. 14 is a schematic diagram illustrating an example of the topology configuration related to the configuration request 50B illustrated in FIG. 13. The first decision unit 41 arranges, as illustrated in FIG. 14, VNF #1 in the first stage of the service chain, the VNF #2 in the next stage of the VNF #1, and the VNF #3 in the next stage of the VNF #2 and, furthermore, decides the topology configuration in which the aggregation LB 13A is arranged in the previous stage of the VNF #1 that is the first stage.

The topology configuration illustrated in FIG. 14 has the configuration that arranges the "LB 1" included in the aggregation LB 13A in the first stage, the FW 1 and the FW 2 included in the VNF #1 in the next stage, the IDS 1 to the IDS 3 included in the VNF #2 in the next stage of the FW 1 and the FW 2, and the Proxy 1 to the Proxy 3 included in the VNF #3 in the next stage of the IDS 1 to the IDS 3.

Figure 15:
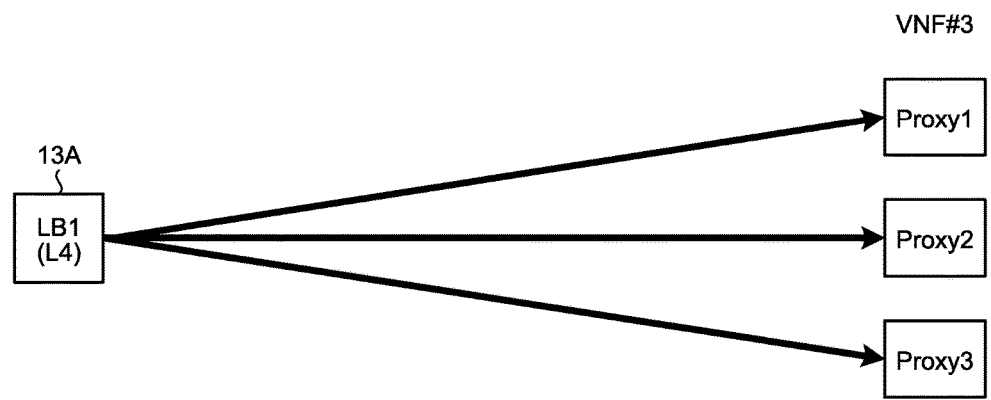
FIG. 15 is a schematic diagram illustrating an example of the terminal destination related to the configuration request illustrated in FIG. 13.

FIG. 15 is a schematic diagram illustrating an example of the terminal destination related to the configuration request 50B illustrated in FIG. 13. Because the aggregation LB 13A is the LB at the L4 level, the third decision unit 42A decides, as illustrated in FIG. 15, for example, the Proxy 1 to the Proxy 3 in the VNF #3 as the terminal VNFs 12, where the L4 level starting from the aggregation LB 13A is terminated. The "LB 1" in the aggregation LB 13A decides the three paths, i.e., the Proxy 1 to the Proxy 3.

Figure 16:
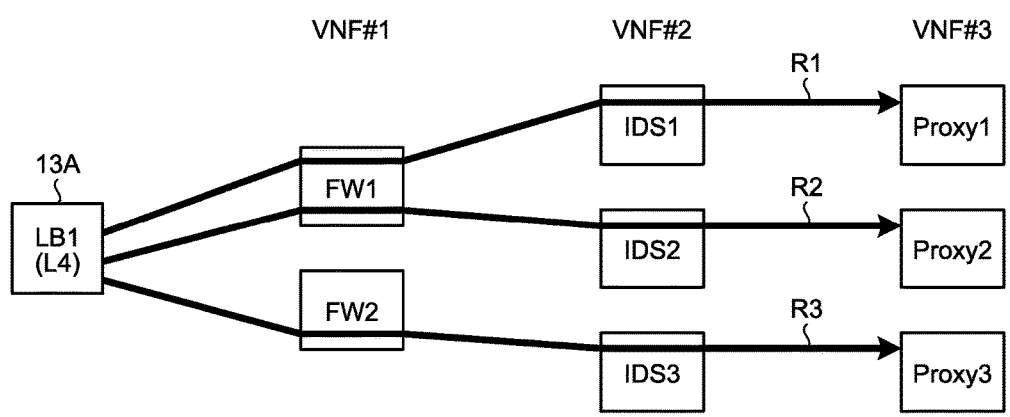
FIG. 16 is a schematic diagram illustrating an example of optimal paths related to the configuration request illustrated in FIG. 13.

FIG. 16 is a schematic diagram illustrating an example of optimal paths related to the configuration request 50B illustrated in FIG. 13. The third decision unit 42A performs the shortest path calculation on the three paths from the "LB 1" in the aggregation LB 13A to the termination VNFs 12, i.e., to the Proxy 1 to the Proxy 3, by increasing the link cost in the paths calculated by using the shortest path cost method, such as the Dijkstra's algorithm or the like, the third decision unit 42A decides the optimal paths R1 to R3 by distributing the paths passing through the VNF #1 and the VNF #2.

Figure 17:
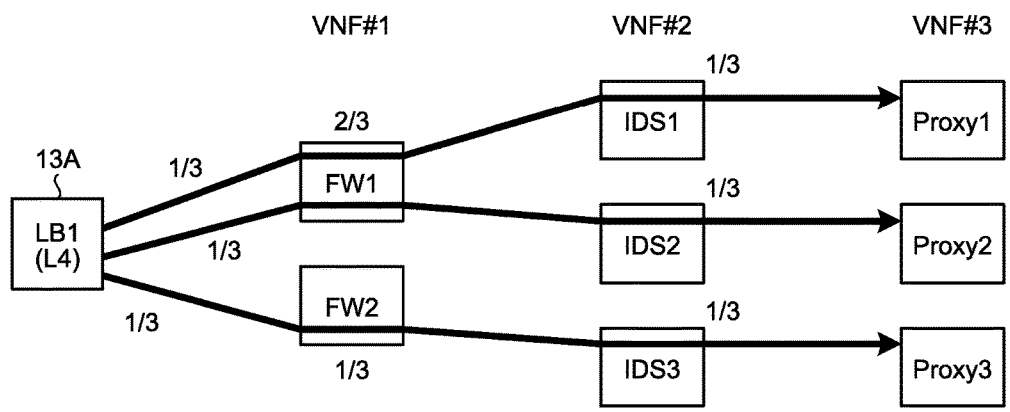
FIG. 17 is a schematic diagram illustrating an example of the distribution ratio of the aggregation LB related to the configuration request illustrated in FIG. 13.

FIG. 17 is a schematic diagram illustrating an example of the distribution ratio of the aggregation LB related to the configuration request 50B illustrated in FIG. 13. The fourth decision unit 42B specifies the maximum number of the VNFs 12, i.e., the VNFs #2, from among the VNF #1 to the VNF #3. The fourth decision unit 42B calculates, at the "LB 1", the distribution ratio of load that is distributed to FW 1 and the FW 2 in the VNF #1 such that the amount of load (traffic) applied to the IDS 1 to the IDS 3 in the VNF #2 is equal from among the three optimal paths from the LB 1 to the terminal VNF 12. For example, the distribution ratio from the "LB 1" to the "FW 1" is 2/3 and the distribution ratio from the "LB 1" to the "FW 2" is 1/3.

Figure 18:
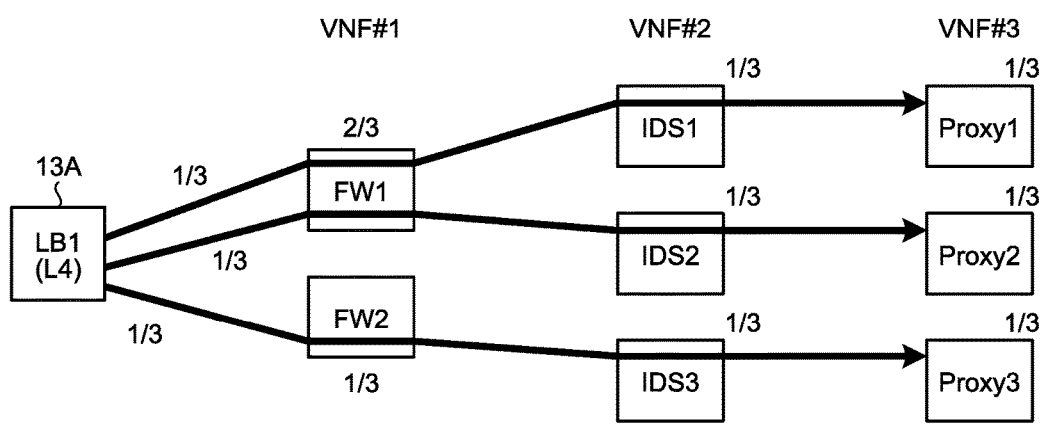
FIG. 18 is a schematic diagram illustrating an example of the traffic ratio of VNF related to the configuration request illustrated in FIG. 13.

FIG. 18 is a schematic diagram illustrating an example of the traffic ratio of VNF 12 related to the configuration request 50B illustrated in FIG. 13. After the fifth decision unit 42C decides the distribution ratio of the load from the "LB 1" in the aggregation LB 13A to each of the FW 1 and the FW 2 in the VNF #1, the fifth decision unit 42C decides the transfer paths on the optimal paths R1 to R3 that are decided before. Furthermore, the fifth decision unit 42C calculates the traffic ratio of each of the VNFs 12 on the respective transfer paths and decides the paths.

The transfer path of the "LB 1" in the aggregation LB 13A serves as the path that transfers the packet addressed to the Proxy 1 to the FW 1, the path that transfers the packet addressed to the Proxy 2 to the FW 1, and path that transfers the packet addressed to the Proxy 3 to the FW 2.

Furthermore, the transfer path of the FW 1 serves as the path that transfers the packet addressed to the Proxy 1 to the IDS 1 and the path that transfers the packet addressed to the Proxy 2 to the IDS 2. The transfer path of the FW 2 serves as the path that transfers the packet addressed to the Proxy 3 to the IDS 3.

Furthermore, the transfer path of the IDS 1 serves as the path that transfers the packet addressed to the Proxy 1 to the Proxy 1. The transfer path of the IDS 2 serves as the path that transfers the packet addressed to the Proxy 2 to the Proxy 2. The transfer path of the IDS 3 serves as the path that transfers the packet addressed to the Proxy 3 to the Proxy 3.

Furthermore, the fifth decision unit 42C calculates the load ratio (traffic ratio) for each transfer path from the VNF #1 to the VNF #2 and decides the traffic ratio. For example, the traffic ratio of the transfer path from the FW 1 to the IDS 1 becomes 1/3, the traffic ratio of the transfer path from the FW 1 to the IDS 2 becomes 1/3, and the traffic ratio of the transfer path from the FW 2 to the IDS 3 becomes 1/3.

Furthermore, the fifth decision unit 42C calculates the traffic ratio for each transfer path from the VNF #2 to the VNP #3 and decides the traffic ratio. For example, the traffic ratio of the transfer path from the IDS 1 to the Proxy 1 becomes 1/3, the traffic ratio of the transfer path from the IDS 2 to the Proxy 2 becomes 1/3, and the traffic ratio of the transfer path from the IDS 3 to the Proxy 3 becomes 1/3.

On the basis of the number of the aggregation LBS 13A and the VNFs 12 and on the basis of the optimal paths R1 to R3 and the transfer path, the arranging unit 43A arranges the aggregation LBs 13A and the VNFs 12 in the virtual area in the general-purpose servers 2B or the like and starts up the function.

The ratio setting unit 43B sets, in the arranged aggregation LB 13A, the distribution ratio of the aggregation LB 13A decided by the fourth decision unit 42B. The ratio setting unit 43B sets, in the arranged VNF 12, the traffic ratio of each of the VNFs 12 decided by the fifth decision unit 42C. Consequently, the service chain of the configuration requests can be constructed in the virtual environment.

On the basis of the number of the aggregation LBs 13A and the VNFs 12, the optimal path, the transfer path, the distribution ratio of the aggregation LB 13A, and the traffic ratio of each of the VNFs 12, the management server 3 constructs the service chain of the configuration requests in a virtual area in the specified general-purpose servers 2B in the carrier NW 2. Consequently, by reducing the number of LBs 13, a transfer delay due to the arrangement of the LB 13 can be suppressed and the resources of the virtual area needed to arrange the subject LB 13 can be reduced.

In the example illustrated in FIG. 18, the single aggregation LB 13A is arrange in the first stage of the service chain and then the distribution ratio of the aggregation LB 13A and the traffic ratio of each of the VNFs 12 are decided such that the amounts of load (traffic) from the aggregation LB 13A to the terminal VNF 12 are equal. Consequently, by setting the number of the LBs 13 is one, the transfer delay can be suppressed and the resources of the infinite virtual area can be reduced.

When the management server 3 according to the embodiment arranges the VNF groups in a plurality of stages in the virtual area, the management server 3 decides the aggregation LB 13A that is to be arranged in the previous stage of the VNF group 20 (VNF #1) that is in the first stage. The management server 3 decides the distribution ratio of the aggregation LB 13A and the traffic ratio of each of the VNFs 12 in which the load (traffic) from the aggregation LB 13A to each of the VNFs 12 in the terminal VNF group 20 is distributed. Then, the management server 3 sets the distribution ratio of the aggregation LB 13A into the aggregation LB 13A in the virtual area and sets the traffic ratio of each of the VNFs 12 into the aggregation LB 13A in the virtual area. Consequently, the management server 3 reduces the number of the LBs 13 by aggregating the LBs 13 that are to be arranged in the previous stage of the VNF group 20 when the management server 3 constructs a service chain, whereby the management server 3 suppresses a delay of the process performed by the subject devices. Furthermore, it is possible to reduce the resources of the virtual area due to the arrangement of the LBs 13.

On the basis of the number of LB instances for each of the VNF groups 20 designated when the VNF groups 20 are arranged in a plurality of stages in the virtual area, the management server 3 decides the number of the aggregation LBs 13A that are to be arranged in the previous stage of the VNF group 20 (VNF #1) that is in the first stage. Consequently, the management server 3 can decides the minimum number of the aggregation LBs 13A that are needed when the service chain is constructed.

The management server 3 designates an arbitrary functional characteristic of each of the VNF groups 20, for example, the VNF group 20 at the L4 level, that are specified by the configuration request and decides the number of the aggregation LBs 13A in accordance with the number of LB instances in the specified VNF group 20. Consequently, when the management server 3 constructs the service chain, the management server 3 can decide the minimum number of the aggregation LBs 13A suitable for the arbitrary functional characteristic.

The management server 3 specifies an arbitrary functional characteristic of each of the VNF groups 20, for example, the VNF groups 20 at the L4 level, that are designated by the configuration request. Furthermore, the management server 3 specifies the VNF group 20 with the maximum number of the VNFs 12 from among the specified VNF groups 20. Furthermore, the management server 3 decides the number of the aggregation LBs 13A in accordance with the number of LB instances in the specified VNF group 20. Consequently, when the management server 3 constructs the service chain, the management server 3 can decides the minimum number of the aggregation LBs 13A suitable for the VNF group 20 that accommodates the maximum number of the VNFs 12 with the arbitrary functional characteristic.

The management server 3 specifies the higher layer characteristic, for example, the VNF group 20 at the L4 level, from among the VNF groups 20 designated by the configuration request and decides the number of the aggregation LBs 13A in accordance with the number of LB instances in the specified VNF group. Consequently, when the management server 3 constructs the service chain, the management server 3 can decide the minimum number of the aggregation LBs 13A suitable for the VNF group 20 that accommodates the VNFs 12 with the higher layer characteristic.

On the basis of the number of the VNFs 12 for each of the VNF groups 20 designated by the configuration request, the management server 3 specifies the VNF group 20 with the higher layer characteristic from among a plurality of the VNF groups 20. Furthermore, the management server 3 decides the number of the aggregation LBs 13A in accordance with the number of LB instances in the specified VNF group and deletes the number of specified LBs 13.

Furthermore, in the embodiment described above, the number of the aggregation LBs 13A is decided in accordance with the number of LB instances designated by the configuration request. However, the number of LB instances is not needed to be included in the configuration request and, in this case, on the basis of the number of instances in the VNF 12 in the VNF group 20 designated by the configuration request, the management server 3 calculates the process performance that is needed for each of the VNF groups 20 and calculates the number of LB instances needed to process them. Then, the management server 3 may also decide the number of the aggregation LBs 13A on the basis of the number of LB instances in each of the VNF groups 20 calculated by the management server 3.

Furthermore, when the first decision unit 41 according to the embodiment described above detects the configuration request 50, the first decision unit 41 specifies the VNF groups 20 at the L4 level that is a higher layer in the configuration request 50 and specifies the VNF group 20 with the maximum number of instances in the VNF 12 from among the specified VNF groups 20. Then, the first decision unit 41 decides the number of the aggregation LBs 13A in accordance with the number of LB instances in the specified VNF group 20. However, the embodiment is not limited to this.

Figure 19A:
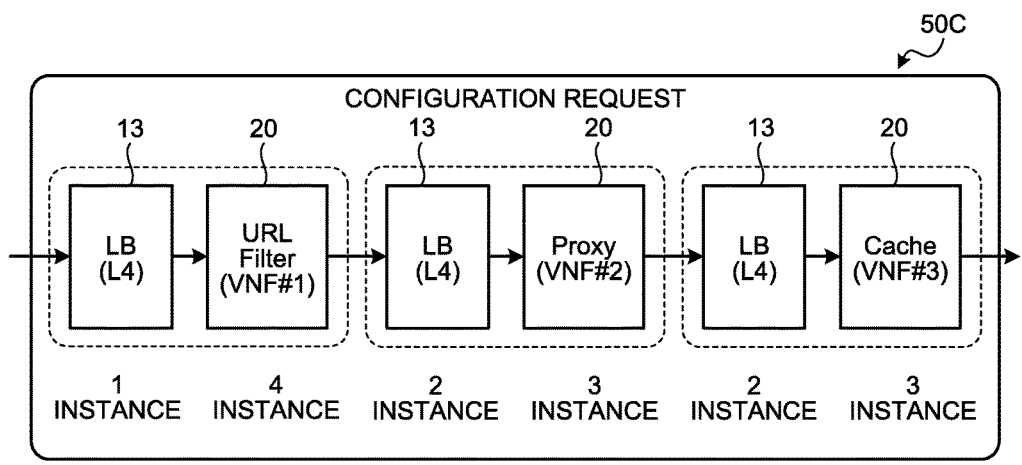
FIG. 19A is a schematic diagram illustrating an example of the arrangement configuration of the configuration request before LB aggregation.
Figure 19B:
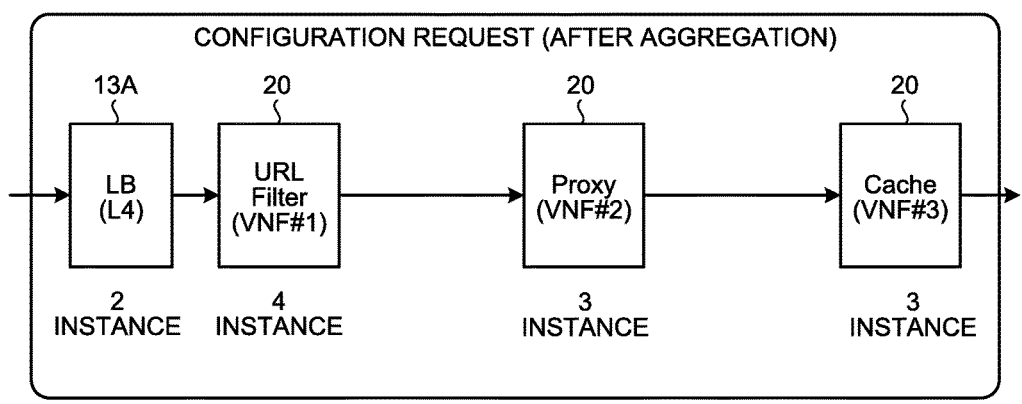
FIG. 19B is a schematic diagram illustrating an example of the arrangement configuration, after the LB aggregation, related to the configuration request illustrated in FIG. 19A.

FIG. 19A is a schematic diagram illustrating an example of the arrangement configuration of a configuration request 50C before LB aggregation. FIG. 19B is a schematic diagram illustrating an example of the arrangement configuration after the LB aggregation related to the configuration request 50C illustrated in FIG. 19A. The configuration request 50C illustrated in FIG. 19A indicates that the VNF #1 is the URL filter, the number of instances in the VNF #1 is "4", the LB type of the VNF #1 is the LB 13 at the L4 level, the number of LB instances in the VNF #1 is "1". Furthermore, the configuration request 50C indicates that the VNF #2 is a Proxy, the number of instances in the VNF #2 is "3", the LB type of the VNF #2 is the LB 13 at the L4 level, and the number in LB instances in the VNF #2 is "2". Furthermore, the configuration request 50C indicates that the VNF #3 is a Cache, the number of instances in the VNF #3 is "3", the LB type of the VNF #3 is the LB 13 at the L4 level, and the number of LB instances in the VNF #3 is "2".

Because all of the VNFs 12 are at the L4 level, the first decision unit 41 specifies the VNF group 20 with the maximum number of instances, i.e., the VNF #3, from among the VNF groups 20 and specifies the number of LB instances "2" at the L4 level in the specified VNF #3. Then, the first decision unit 41 decides the number of LB instances "2" at the L4 level as the number of instances in the aggregation LB 13A. Consequently, as illustrated in FIG. 19B, the configuration in which the two aggregation LBs 13A at the L4 level is arranged in the first stage, the VNF #1 is arranged in the next stage thereof, the VNF #2 is arranged in the next stage thereof, and the VNF #3 is arranged in the next stage thereof. Consequently, if the VNF groups 20 each have the same level characteristics (L4 level), the LBs 13 at the L4 level can be aggregated.

Figure 20A:
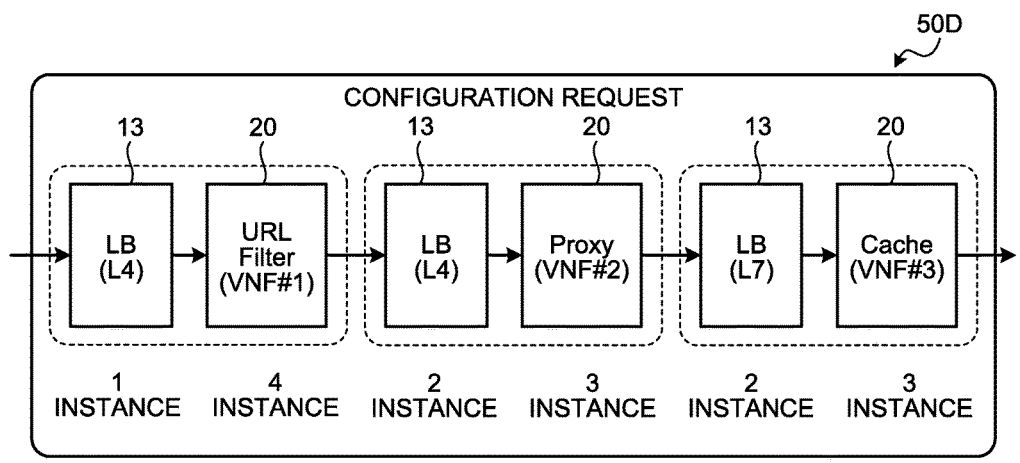
FIG. 20A is a schematic diagram illustrating an example of the arrangement configuration of the configuration request before LB aggregation.
Figure 20B:
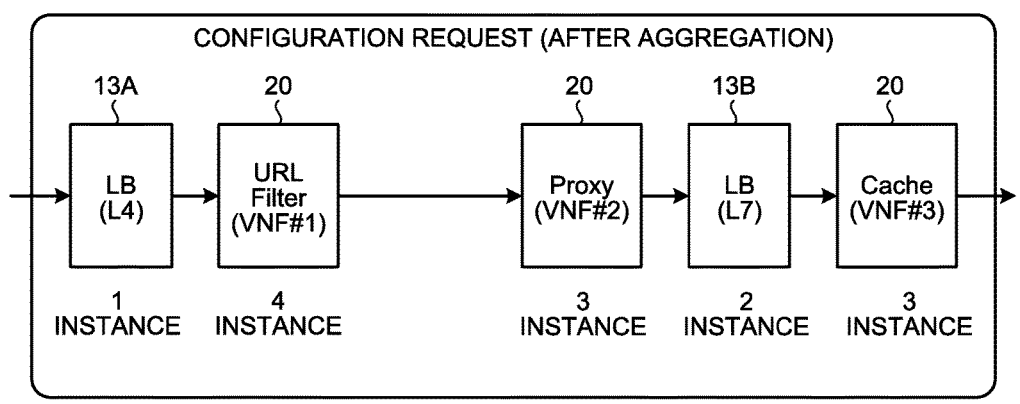
FIG. 20B is a schematic diagram illustrating an example of the arrangement configuration, after the LB aggregation, related to the configuration request illustrated in FIG. 20A.

FIG. 20A is a schematic diagram illustrating an example of the arrangement configuration of a configuration request 50D before LB aggregation. FIG. 20B is a schematic diagram illustrating an example of the arrangement configuration after the LB aggregation related to the configuration request 50D illustrated in FIG. 20A. The configuration request 50D illustrated in FIG. 20A indicates that the VNF #1 is the URL filter, the number of instances in the VNF #1 is "4", the LB type of the VNF #1 is the LB 13 at the L4 level, and the number of LB instances in the VNF #1 is "1". Furthermore, configuration request 50D indicates that the VNF #2 is a Proxy, the number of instances in the VNF #2 is "3", the LB type of the VNF #2 is the LB 13 at the L4 level, and the number of LB instances in the VNF #2 is "2".

Furthermore, configuration request 50D indicates that the VNF #3 is a Cache, the number of instances in the VNF #3 is "3", the LB type of the VNF #3 is the LB 13 at the L7 level, and the number of LB instances in the VNF #3 is "2". Furthermore, it is assumed that the VNF #1 and the VNF #2 are at the L4 level and it is assumed that the VNF #3 in the next stage is at the L7 level.

Because the VNF #1 and the VNF #2 at the L4 level are continued, the first decision unit 41 specifies the VNF group 20 with the maximum number of instances, i.e., the VNF #1, from among the VNF groups 20 at the L4 level and specifies the number of LB instances of "1" at the L4 level of the specified VNF #1. Then, the first decision unit 41 decides the number of LB instances "1" at the L4 level as the number of instances in the aggregation LB 13A to be arranged in the previous stage of the VNF #1.

Furthermore, the first decision unit 41 specifies, in the VNF group 20 of the VNF #3 at the L7 level, the VNF group 20, i.e., the VNF #3, with the maximum number of instances and specifies the number of LB instances "2" at the L7 level of the specified VNF #3. Then, the first decision unit 41 decides the number of instances "2" of the LB 13 at the L7 level as the number of instances in the aggregation LB 13B at the L7 level that is arranged in the previous stage of the VNF #3.

Namely, in the service chain of the configuration request 50D illustrated in FIG. 20B, the aggregation LBs 13A are arranged for each level characteristic, for example, the aggregation LB 13A at the L4 level is arranged in the previous stage of the VNF #1 and the aggregation LB 13B at the level L7 is arranged in the previous stage of the VNF #3. Consequently, the aggregation LB 13A can perform the arrangement at the L4 level, i.e., in units of sessions of the TCP. Furthermore, the aggregation LB 13B can perform the arrangement at the level L7, i.e., in units of identifiers at the application level, such as the URL of the HTTP protocol, a user name that is used in an application, or a file name.

The management server 3 decides, from among the layer characteristics of each of the VNF groups 20 designated by the configuration request, the same layer characteristic in each of the optimal paths R, for example, the number of the aggregation LB 13A (13B) to be arranged in the previous stage of the VNF group 20 (VNF #1) that is the first stage at the L4 level or the L7 level.

Furthermore, the management server 3 decides the VNF 12 serving as the terminal VNF 12 with the same layer characteristic in the VNF group 20 and decides the optimal path R from the aggregation LB 13A to each of the terminal VNFs 12. The management server 3 decides the traffic ratio to each of the VNFs 12 (VNF #1) in the first stage such that an amount of load (traffic) applied to each of the VNFs 12, which have the same layer characteristic in each of the optimal paths R, in the VNF group 20 that has the maximum number of instances is equal. Consequently, by reducing the number of the aggregation LBs 13A for each of the same layer characteristics, it is possible to suppress a transfer delay.

Figure 21A:
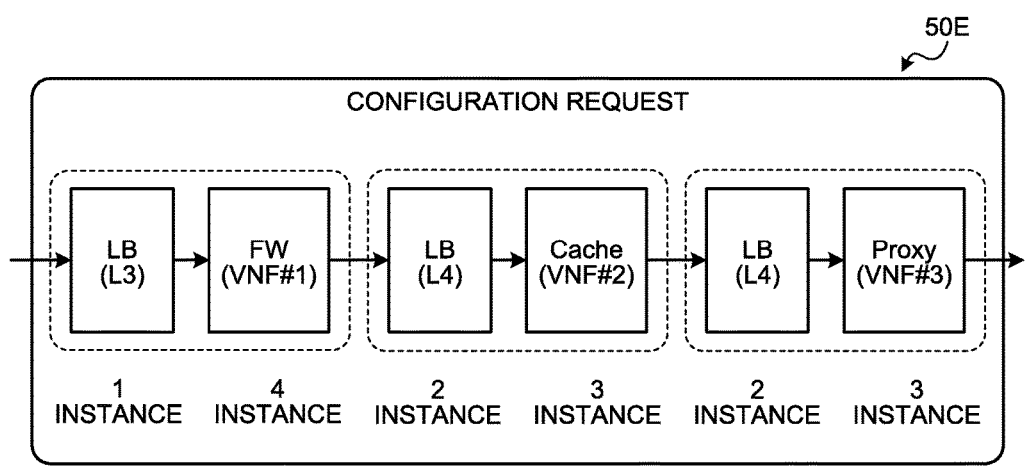
FIG. 21A is a schematic diagram illustrating an example of the arrangement configuration of a configuration request before LB aggregation.
Figure 21B:
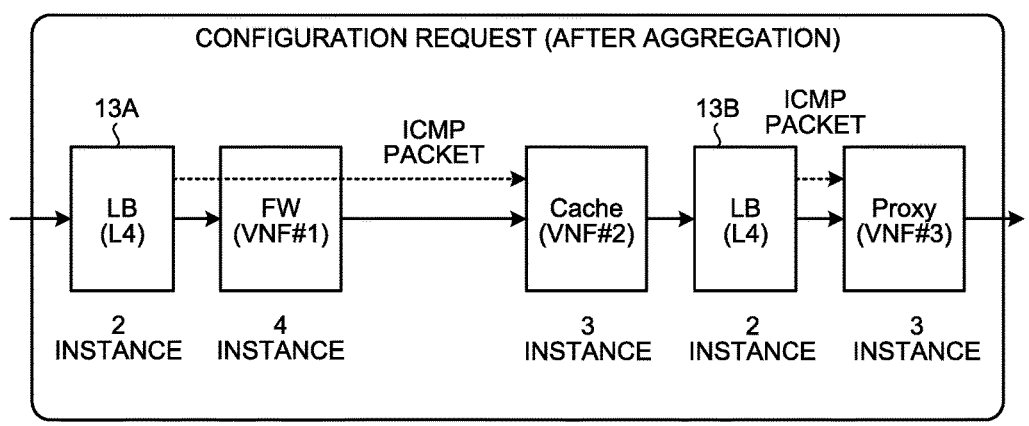
FIG. 21B is a schematic diagram illustrating an example of the arrangement configuration, after the LB aggregation, related to the configuration request illustrated in FIG. 21A.

FIG. 21A is a schematic diagram illustrating an example of the arrangement configuration of a configuration request 50E before LB aggregation. FIG. 21B is a schematic diagram illustrating an example of the arrangement configuration after the LB aggregation related to the configuration request 50E illustrated in FIG. 21A. The configuration request 50E illustrated in FIG. 21A indicates that the VNF #1 is the "FW", the number of instances in the VNF #1 is "4", the LB type of the VNF #1 is the LB 13 at the L3 level, and the number of LB instances in the VNF #1 is "1".

Furthermore, the configuration request 50E indicates that the VNF #2 is a Cache, the number of instances in the VNF #2 is "3", the LB type of the VNF #2 is the LB 13 at the L4 level, and the number of LB instances in the VNF #2 is "2". Furthermore, the configuration request 50E indicates that the VNF #3 is a Proxy, the number of instances in the VNF #3 is "3", the LB type of the VNF #3 is the LB 13 at the L4 level, and the number of LB instances in the VNF #3 is "2".

The configuration request 50E indicates that the VNF #1 is the L3 level and the VNF #2 and the VNF #3 are the L4 level. The L3 level can perform the distribution in units of sessions of the TCP in the LB 13 at the L4 level that is the higher layer. At this point, the VNF #2 and the VNF #3 serve as the VNF group 20 that terminates the TCP session.

By sending an Internet control message protocol (ICMP) packet, the LB 13 has a function of monitoring communication with the distribution destination. However, if the LB 13 at the L4 level is arranged in the previous stage of the VNF #1 as the aggregation LB 13A, because the TCP session is terminated in the VNF #2, although the arrival of the ICMP packet up to the VNF #2 can be monitored, it is not possible to monitor the arrival of the ICMP packet after the VNF #3 and the subsequent path.

Thus, the first decision unit 41 arranges the aggregation LB 13A in the previous stage of the VNF #1 with the number of instances in the LB 13 at the L4 level for the VNF #2 and arranges the aggregation LB 13B in the previous stage of the VNF #3 with the number of instances in the LB 13 at the L4 level for the VNF #3. Consequently, the aggregation LB 13A can monitor the arrival of the ICMP packet up to the VNF #2 and the aggregation LB 13B can monitor the arrival of the ICMP packet up to the VNF #3.

In the embodiment described above, an optimal path of the aggregation LB 13A is decided and the distribution ratio of the aggregation LB 13A is calculates; however, an optimal path of the aggregation LB 13A may also be decided after the distribution ratio of the aggregation LB 13A is calculated.

In the embodiment described above, after the distribution ratio of the aggregation LB 13A is calculated, the traffic ratio for each of the VNFs 12 of the optimal paths is calculated. However, after the traffic ratio for each of the VNFs 12 of the optimal paths has been calculated, the distribution ratio of the aggregation LB 13A may also be calculated or both the traffic ratio for each of the VNFs 12 of the optimal paths and the distribution ratio of the aggregation LB 13A may also simultaneously be calculated by using a specific algorithm.

In the embodiment described above, from among a plurality of VNF groups 20 designated by the configuration request, the number of the aggregation LBs 13A is decided by using the functional characteristic, for example, the number of LB instances in the VNF group 20 at the L4 level. However, it may also possible to specify the VNF group 20 that is used for, for example, calculation functions as the functional characteristic distributed in the hash calculation of the transmission source address and decide the number of the aggregation LBs 13A by using the number of LB instances in the specified VNF group 20.

In the embodiment described above, the aggregation may also be performed in the LB 13 in the first stage by using the number of LB instances in each of the VNF groups 20 designated by the configuration request and the number of LB instances in the first stage may also be calculated. Furthermore, it may also possible to use the configuration request that designates the aggregation LB 13A in the first stage, the VNF 12 in the next stage connected to the aggregation LB 13A, and the number of instances in the subject VNF 12.

Furthermore, when the management server 3 according to the first embodiment described above arranges the VNF groups 20 in a plurality of stages in the virtual area, the management server 3 decides the aggregation LBs 13A that are to be arranged in the previous stage of the VNF group 20 (VNF #1) that is in the first stage. The management server 3 decides the distribution ratio of the aggregation LBs 13A and decides the load ratio (traffic ratio) and a transfer path of each of the VNFs 12 such that the load (traffic) from the aggregation LB 13A to each of the VNFPs 12 in the terminal VNF group 20 is distributed. Then, the management server 3 sets the distribution ratio of the aggregation LBs 13A into the aggregation LBs 13A in the virtual area and sets the traffic ratio of each of the VNFs 12 into each of the VNFs 12 on the transfer path. However, in the management server 3, for example, there may be a case of performing scale out in which the new VNF 12 is added in accordance with an increase in an amount of traffic in the service chain system 1. In this case, the settings of the plurality of the VNFs 12 included in the service chain system 1 need to be changed. However, because it is difficult to ensure synchronization of the setting changes of the VNFs 12, a time difference occurs between the setting completion time of the transfer paths of the aggregation LB 13A and each of the VNFs 12 and a communication disconnection consequently occurs. Thus, an embodiment of the service chain system 1 that can avoid, even if a setting change due to an addition of the VNF 12 occurs, the occurrence of a communication disconnection will be described below as a second embodiment.

[b] Second Embodiment

Figure 22A:
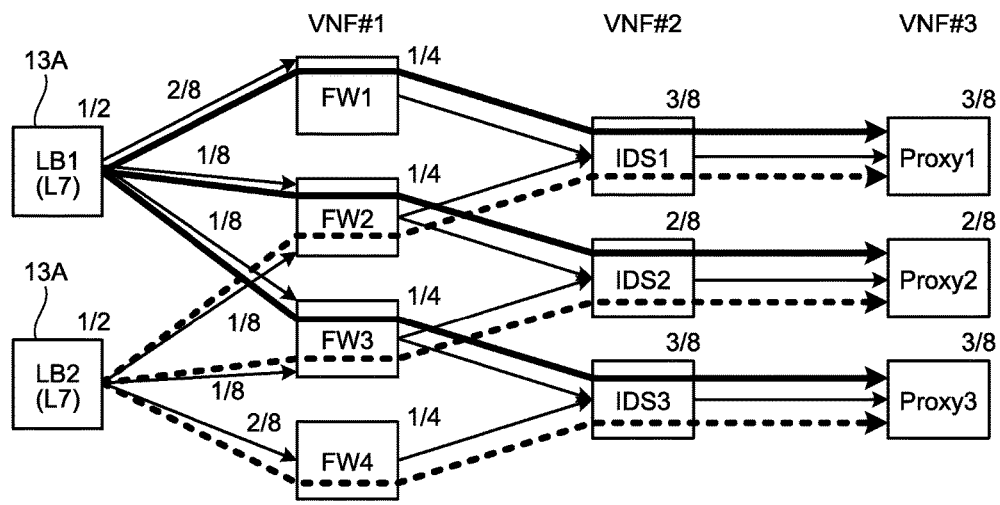
FIG. 22A is a schematic diagram illustrating an example of the arrangement configuration of before the addition of a FW 5 according to a second embodiment.
Figure 22B:
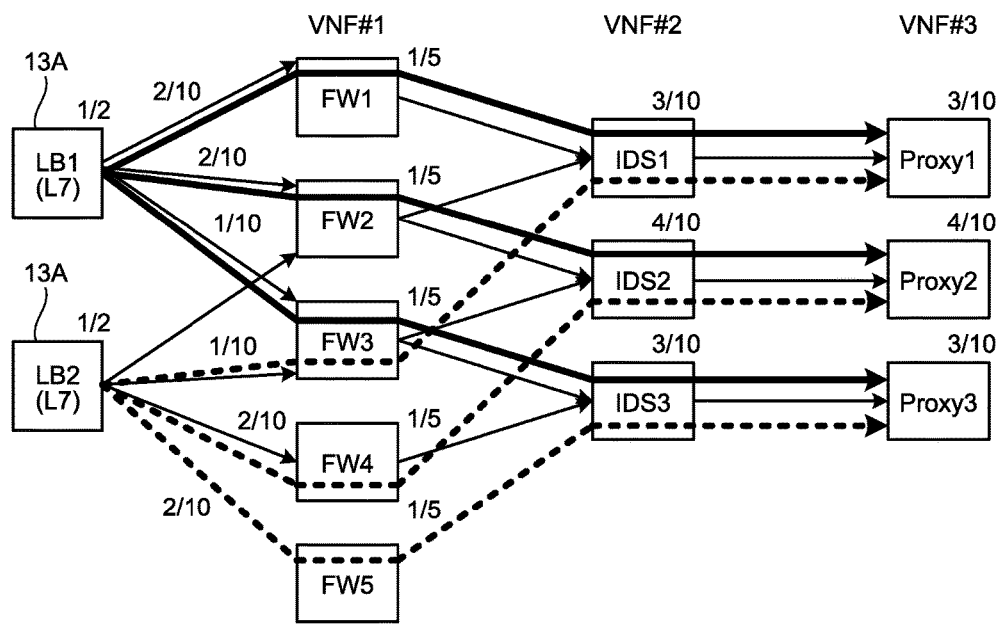
FIG. 22B is a schematic diagram illustrating an example of the arrangement configuration of after the addition of the FW 5.

FIG. 22A is a schematic diagram illustrating an example of the arrangement configuration of before the addition of a FW 5 according to a second embodiment; FIG. 22B is a schematic diagram illustrating an example of the arrangement configuration of after the addition of the FW 5; and FIG. 23 is a schematic diagram illustrating an example of the distribution ratio of the aggregation LBs 13A and a transfer path of each of the VNFs 12 of before and after the addition of the FW 5.

The arrangement configuration illustrated in FIG. 22A is the arrangement configuration of the VNFs 12 of before the addition of the FW 5, i.e., before scale out, in the service chain system 1. The arrangement configuration illustrated in FIG. 22A is set such that the two LB 1 and the LB 2 are arranged as the VNF group 20 in the first stage, the four FW 1 to the FW 4 are arranged as the VNF #1 in the next stage of the first stage, the three IDS 1 to the IDS 3 are arranged as the VNF #2 in the next stage of the VNF #1, and the three Proxy 1 to Proxy 3 are arranged as the VNF #3 in the last stage.

The distribution ratio of the LB 1 of before the addition of the FW 5 is set such that the transmission of 2/8 of the total amount of traffic, i.e., 1/4 of the amount of traffic received by the LB 1, addressed to the Proxy 1 is to be performed via the FW 1. Furthermore, the distribution ratio of the LB 1 is set such that the transmission of 1/8 of the total amount of traffic, i.e., 1/8 of the amount of traffic received by the LB 1, addressed to the Proxy 2 is to be performed via the FW 2. Furthermore, the distribution ratio of the LB 1 is set such that the transmission of 1/8 of the total amount of traffic, i.e., 1/8 of the amount of traffic received by the LB 1, addressed to the Proxy 3 is to be performed via the FW 3.

The distribution ratio of the LB 2 of before the addition of the FW 5 is set such that the transmission of 1/8 of the total amount of traffic, i.e., 1/8 of the amount of traffic received by the LB 2, addressed to the Proxy 1 is to be performed via the FW 2. Furthermore, the distribution ratio of the LB 2 is set such that the transmission of 1/8 of the total amount of traffic, i.e., 1/8 of the amount of traffic received by the LB 2, addressed to the Proxy 2 is to be performed via the FW 3. Furthermore, the distribution ratio of the LB 2 is set such that the transmission of 2/8 of the total amount of traffic, i.e., 1/4 of the amount of traffic received by the LB 2, addressed to the Proxy 3 is to be performed via the FW 4.

The transfer path of the LB 1 of before the addition of the FW 5 is set such that the transmission addressed to the Proxy 1 is to be performed via the FW 1, the transmission addressed to the Proxy 2 is to be performed via the FW 2, and the transmission addressed to the Proxy 3 is to be performed via the FW 3. The transfer path of the LB 2 of before the addition of the FW 5 is set such that the transmission addressed to the Proxy 1 is to be performed via the FW 2, the transmission addressed to the Proxy 2 is to be performed via the FW 3, and the transmission addressed to the Proxy 3 is to be performed via the FW 4. The transfer path of the FW 1 of before the addition of the FW 5 is set such that the transmission addressed to the Proxy 1 is to be performed via the IDS 1. The transfer path of the FW 2 of before the addition of the FW 5 is set such that the transmission addressed to the Proxy 1 is to be performed via the IDS 1 and the transmission addressed to the Proxy 2 is to be performed via the IDS 2. The transfer path of the FW 3 of before the addition of the FW 5 is set such that the transmission addressed to the Proxy 2 is to be performed via the IDS 2 and the transmission addressed to the Proxy 3 is to be performed via the IDS 3. The transfer path of the FW 4 of before the addition of the FW 5 is set such that the transmission addressed to the Proxy 3 is to be performed via the IDS 3. The transfer path of the IDS 1 of before the addition of the FW 5 is set such that the transmission addressed to the Proxy 1 is to be performed via the Proxy 1. The transfer path of the IDS 2 of before the addition of the FW 5 is set such that the transmission addressed to the Proxy 2 is to be performed via the Proxy 2. The transfer path of the IDS 3 of before the addition of the FW 5 is set such that the transmission addressed to the Proxy 3 is to be performed via the Proxy 3.

The arrangement configuration illustrated in FIG. 22B is the arrangement configuration after scale out, i.e., after the FW 5 has been added to the VNF #2 in the arrangement configuration illustrated in FIG. 22A.

The distribution ratio of the LB 1 of after the addition of the FW 5 is set such that the transmission of 2/10 of the total amount of traffic, i.e., 1/5 of the amount of traffic received by the LB 1, addressed to the Proxy 1 is to be performed via the FW 1. Furthermore, the distribution ratio of the LB 1 is set such that the transmission of 2/10 of the total amount of traffic, i.e., 1/5 of the amount of traffic received by the LB 1, addressed to the Proxy 2 is to be performed via the FW 2. Furthermore, the distribution ratio of the LB 1 is set such that the transmission of 1/10 of the total amount of traffic, i.e., 1/10 of the amount of traffic received by the LB 1, addressed to the Proxy 3 is to be performed via the FW 3. The distribution ratio of the LB 2 of after the addition of the FW 5 is set such that the transmission of 1/10 of the total amount of traffic, i.e., 1/10 of the amount of traffic received by the LB 2, addressed to the Proxy 1 is to be performed via the FW 3. Furthermore, the distribution ratio of the LB 2 is set such that the transmission of 2/10 of the total amount of traffic, i.e., 1/5 of the amount of traffic received by the LB 2, addressed to the Proxy 2 is to be performed via the FW 4. Furthermore, the distribution ratio of the LB 2 is set such that the transmission of 2/10 of the total amount of traffic, i.e., 1/5 of the amount of traffic received by the LB 2, addressed to the Proxy 3 is to be performed via the FW 5.

The transfer path of the LB 1 of after the addition of the FW 5 is set such that the transmission addressed to the Proxy 1 is to be performed via the FW 1, the transmission addressed to the Proxy 2 is to be performed via the FW 2, and the transmission addressed to the Proxy 3 is to be performed via the FW 3. The transfer path of the LB 2 of after the addition of the FW 5 is set such that the transmission addressed to the Proxy 1 is to be performed via the FW 3, the transmission addressed to the Proxy 2 is to be performed via the FW 4, and the transmission addressed to the Proxy 3 is to be performed via the FW 5. The transfer path of the FW 1 of after the addition of the FW 5 is set such that the transmission addressed to the Proxy 1 is to be performed via the IDS 1. The transfer path of the FW 2 of after the addition of the FW 5 is set such that the transmission addressed to the Proxy 2 is to be performed via the IDS 2. The transfer path of the FW 3 of after the addition of the FW 5 is set such that the transmission addressed to the Proxy 1 is to be performed via the IDS 1 and the transmission addressed to the Proxy 3 is to be performed via the IDS 3. The transfer path of the FW 4 of after the addition of the FW 5 is set such that the transmission addressed to the Proxy 2 is to be performed via the IDS 2. The transfer path of the FW 5 is set such that the transmission addressed to the Proxy 3 is to be performed via the IDS 3. The transfer path of the IDS 1 of after the addition of the FW 5 is set such that the transmission addressed to the Proxy 1 is to be performed via the Proxy 1. The transfer path of the IDS 2 of after the addition of the FW 5 is set such that the transmission addressed to the Proxy 2 is to be performed via the Proxy 2. The transfer path of the IDS 3 of after the addition of the FW 5 is set such that the transmission addressed to the Proxy 3 is to be performed via the Proxy 3.

Figure 24:
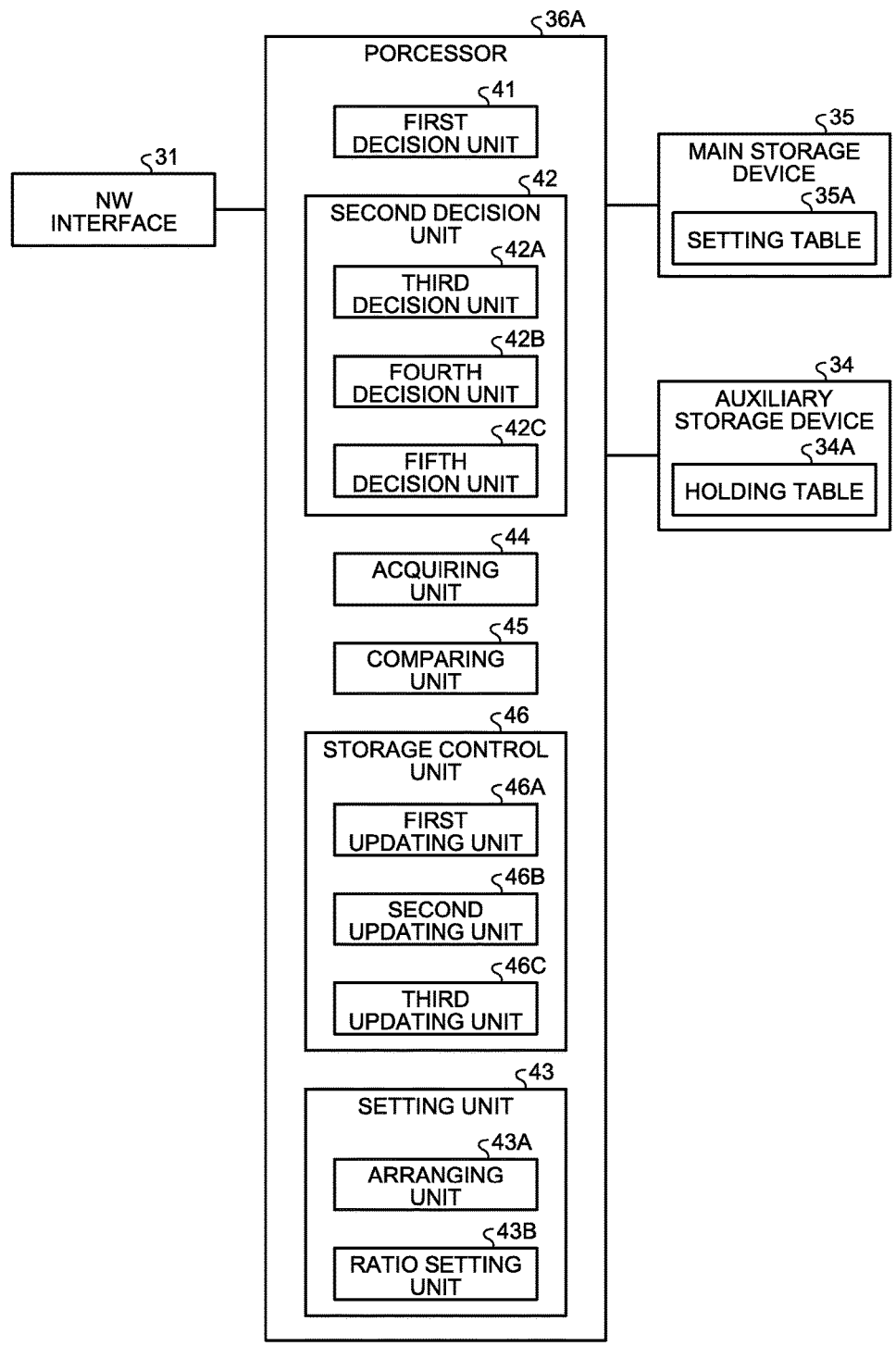
FIG. 24 is a schematic diagram illustrating an example of the functional configuration of a processor included in a management server according to a second embodiment.

FIG. 24 is a schematic diagram illustrating an example of the functional configuration of the processor 36A included in the management server 3 according to a second embodiment. Furthermore, by assigning the same reference numerals to components having the same configuration as those of the service chain system 1 according to the first embodiment, overlapped descriptions of the configuration and the operation thereof will be omitted.

The processor 36A illustrated in FIG. 24 includes, in addition to the first decision unit 41, the second decision unit 42, and the setting unit 43, an acquiring unit 44, a comparing unit 45, and a storage control unit 46. The main storage device 35 includes an area that stores therein, for example, a setting table 35A. The setting table 35A stores therein the transfer paths of each of the current state of the VNFs 12 and the aggregation LBs 13A, the distribution ratio of the aggregation LBs 13A, and the like. The auxiliary storage device 34 includes an area that stores therein, for example, a holding table 34A that will be described later. The acquiring unit 44 acquires, from the setting table 34A, both the distribution ratio of the aggregation LBs 13A of before the addition and the transfer path of each of the VNFs 12 and the aggregation LBs 13A of before the addition. Furthermore, the distribution ratio of the aggregation LBs 13A of before the addition is the distribution ratio used before the new VNF 12 is added to the service chain system 1. The transfer paths of the aggregations LBs 13A and each of the VNFs 12 of before the addition are the transfer paths used before the new VNF 12 is added to the service chain system 1. Furthermore, the acquiring unit 44 acquires both the distribution ratio of the aggregation LBs 13A of after the addition and the transfer paths of each of the VNFs 12 and the aggregation LBs 13A of after the addition. Furthermore, the distribution ratio of the aggregation LBs 13A of after the addition is the distribution ratio that is obtained by the second decision unit 42 when the new VNF 12 is added to the service chain system 1. The transfer paths of the aggregation LBs 13A and each of the VNFs 12 of after the addition are the transfer paths to be used when the new VNF 12 is added to the service chain system 1. The acquiring unit 44 acquires both the transfer paths of the aggregation LBs 13A and each of the VNFs 12 of after the addition and the distribution ratio of the aggregation LBs 13A of after the addition calculated by the second decision unit 42B.

The comparing unit 45 designates the VNF group 20 in the last stage in the service chain system 1 and compares, for each of the VNFs 12 in the designated VNF group 20, the transfer paths of before and after the addition. After the completion of the comparison of the transfer paths of before and after the addition of all of the VNFs 12 in the VNF group 20 in the last stage, the comparing unit 45 then designates the VNF group 20 in the last stage. Namely, as illustrated in FIGS. 22A and 22B, the comparing unit 45 sequentially designates each of the VNF groups 20 in the order of the VNF #3 (Proxy) in the last stage→the VNF #2 (IDS)→the VNF #1 (FW)→VNF group (LB) in the first stage. Then, the comparing unit 45 sequentially compares the transfer paths of before and after the addition for each of the VNFs 12 included in the designated VNF group 20. The storage control unit 46 includes a first updating unit 46A, a second updating unit 46B, and a third updating unit 46C. The first updating unit 46A compares, in the comparing unit 45, the transfer paths of before and after the addition of the designated VNF 12 and determines whether the transfer path of after the addition of the designated VNF 12 is the transfer path addressed to the destination address that has not been set before the addition. Furthermore, the destination address corresponds to the communication destination, for example, the Proxies 1 to 3 or the like, that uses the service chain, whereas the unset destination address is the destination address that is not set to the transfer path of before the addition in the designated VNF 12.

If the transfer path of after the addition of the designated VNF 12 is the transfer path addressed to the destination address that is not set before the addition, the first updating unit 46A additionally registers, into the setting table 35A, the transfer path addressed to the unset destination address of the designated VNF 12. Furthermore, the setting table 35A is the area that stores therein the transfer paths of before the addition that are currently being set. When focusing on, for example, the transfer path of the FW 3 illustrated in FIG. 23, the first updating unit 46A additionally registers, into the setting table 35A, the transfer path for the "transmission addressed to the Proxy 1 to be performed via the IDS 1" as the transfer path of after the addition that is addressed to the destination address that is not set before the addition.

If the transfer path of after the addition of the designated VNF 12 is not the transfer path addressed to the destination address that is not set before the addition, the second updating unit 46B determines whether the transfer path of after the addition of the designated VNF 12 is addressed to the same destination address as that of the transfer path of before the addition and has a different output destination. If the transfer path of after the addition of the designated VNF 12 is addressed to the same destination address as that of the transfer path of before the addition and has a different output destination, the second updating unit 46B updates the relevant transfer path of the designated VNF 12 stored in the setting table 35A. When focusing on, for example, the transfer path of the LB 2 illustrated in FIG. 23, the second updating unit 46B decides the transfer path of the "transmission addressed to the Proxy 1 to be performed via the FW 3" as the transfer path that is addressed to the same transfer path as that of the transfer path of before the addition and that has a different output destination. Then, the second updating unit 46B updates the transfer path of the "transmission addressed to the Proxy 1 to be performed via the FW 2" for the LB 2 stored in the setting table 35A to the "transmission addressed to the Proxy 1 to be performed via the FW 3". Furthermore, the output destination is the output destination of the designated VNF 12 or the aggregation LB 13A. The update also includes deletion or addition.

If the transfer path of after the addition of the designated VNF 12 is the transfer path addressed to the same destination address as that of the transfer path of before the addition and does not have a different output destination, the third updating unit 46C determines whether the transfer path of before the addition of the designated VNF 12 is the transfer path that is irrelevant to the transfer path of after the addition. If the transfer path of the designated VNF 12 of before the addition is the transfer path that is irrelevant to the transfer path of after the addition, the third updating unit 46C holds the irrelevant transfer path in the holding table 34A. When focusing on, for example, the transfer path of the FW 3 illustrated in FIG. 23, the third updating unit 46C decides the "transmission addressed to the Proxy 2 to be performed via the IDS 2" for the FW 3 as the transfer path of before the addition that is irrelevant to the transfer path of after the addition. Then, the third updating unit 46C holds, in the holding table 34A, the "transmission addressed to the Proxy 2 to be performed via the IDS 2" as the transfer path of before the addition used for the FW 3.

Then, after the completion of the comparison of the transfer paths of before and after the addition of all of the VNFs 12 in all of the VNF groups 20, the setting unit 43 sets the distribution ratio of the aggregation LBs 13A of after the addition. Furthermore, after having set the distribution ratio of the aggregation LBs 13A, the third updating unit 46C deletes, from the setting table 35A, irrelevant transfer paths held in the holding table 34A. Consequently, the setting table 35A is updated to the transfer path of each of the VNFs 12 of after the addition of the FW 5.

Figure 25:
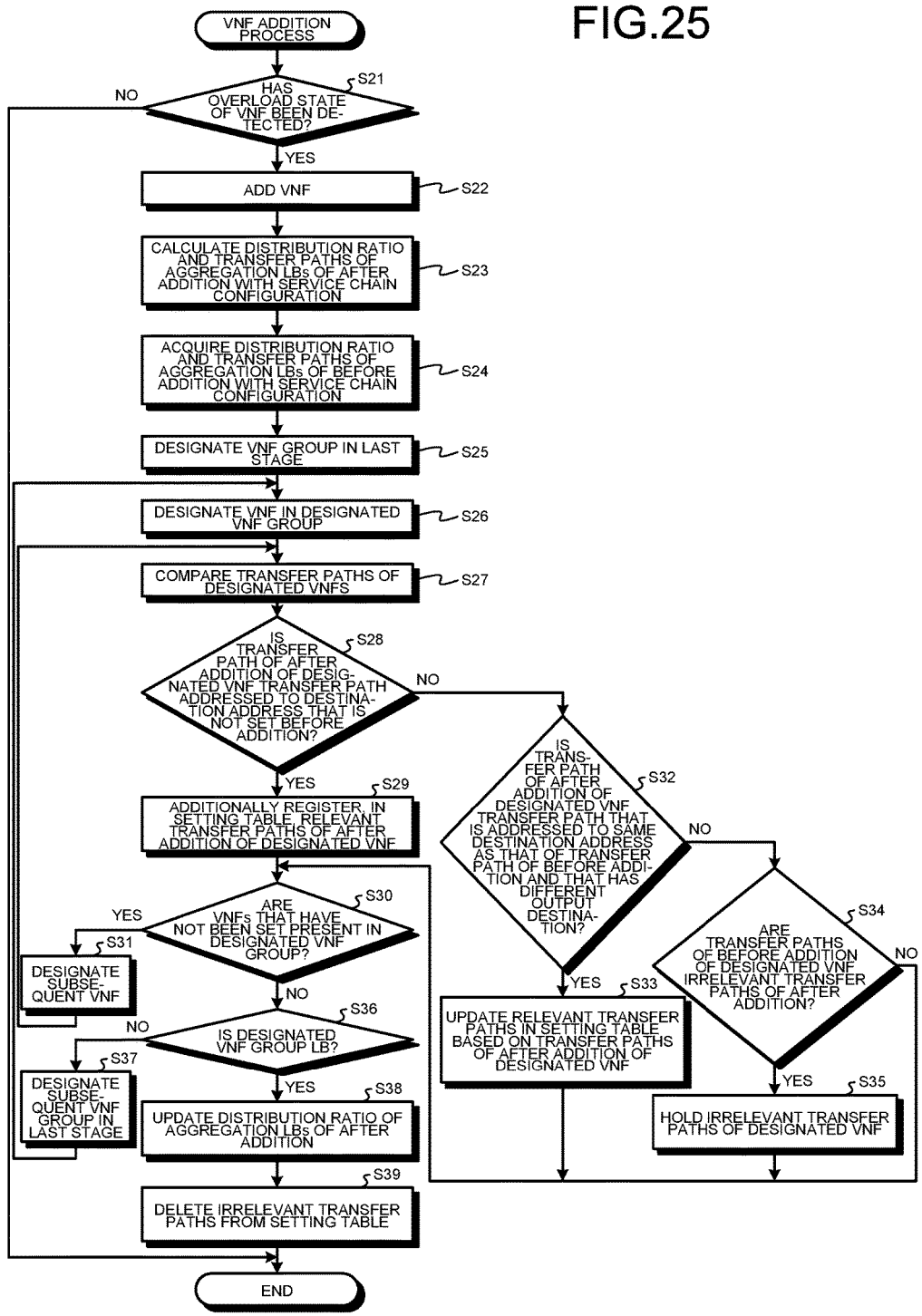
FIG. 25 is a flowchart illustrating the flow of a processing operation related to a VNF addition process performed by the processor included in the management server.

In the following, an operation of the management server 3 performed when a VNF is added will be described. FIG. 25 is a flowchart illustrating the flow of a processing operation related to a VNF addition process performed by the processor 36A included in the management server 3.

In FIG. 25, the processor 36A in the management server 3 determines whether an overload state of the VNF 12 has been detected (Step S21). If an overload state of the VNF 12 has been detected (Yes at Step S21), the setting unit 43 in the processor 36A adds the new VNF 12 that copes with resolving the overload state to the service chain system 1 (Step S22).

The acquiring unit 44 in the processor 36A calculates the distribution ratio and the transfer paths of the aggregation LBs 13A with the service chain configuration of after the addition of the VNF 12 (Step S23). The acquiring unit 44 acquires, from the setting table 35A, the distribution ratio and the transfer path of the aggregation LBs 13A with the service chain configuration of before the addition of the VNF 12 (Step S24).

The comparing unit 45 designates the VNF group 20 in the last stage with the service chain configuration (Step S25). Furthermore, the VNF group 20 in the last stage is the VNF group #3 if the arrangement configuration illustrated in FIG. 21B is used. The comparing unit 45 designates the VNF 12 in the designated VNF group 20 (Step S26). The comparing unit 45 compares the transfer paths of before and after the addition of the designated VNF 12 (Step S27).

The first updating unit 46A determines whether the transfer path of after the addition of the designated VNF 12 is the transfer path addressed to the destination address that is not set before the addition (Step S28). Furthermore, when the arrangement configuration illustrated in FIG. 22B is used, the destination addresses are, for example, the last destination addresses, such as the Proxies 1 to 3, or the like. If the transfer path of after the addition of the designated VNF 12 is the transfer path addressed to the destination address that is not set before the addition (Yes at Step S28), the first updating unit 46A registers, in the setting table 35A, the relevant transfer path of after the addition of the designated VNF 12 (Step S29). After having registered the relevant transfer path in the setting table 35A, the comparing unit 45 determines whether the VNFs 12 that have not been set are present in the designated VNF group 20 (Step S30).

If the VNFs 12 that have not been set are present in the designated VNF group 20 (Yes at Step S30), the comparing unit 45 designates the subsequent VNF 12 from among the VNFs 12 that have not been set in the designated VNF group 20 (Step S31). Then, after having designated the subsequent VNF 12, the comparing unit 45 proceeds to Step S27 in order to compare the transfer paths of before and after the addition of the designated VNF 12.

If the transfer path of after the addition of the designated VNF 12 is not the transfer path addressed to the destination address that is not set before the addition (No at Step S28), the second updating unit 46B proceeds to Step S32. The second updating unit 46B determines whether the transfer path of after the addition of the designated VNF 12 is the transfer path that is addressed to the same destination address as that of transfer path of before the addition and that has a different output destination (Step S32). If the transfer path of after the addition of the designated VNF 12 is the transfer path that is addressed to the same destination address as that of transfer path of before the addition and that has a different output destination (Yes at Step S32), the second updating unit 46B proceeds to Step S33. The second updating unit 46B updates the relevant transfer path in the setting table 35A on the basis of the transfer path of after the addition of the designated VNF 12 (Step S33). Then, the comparing unit 45 proceeds to Step S30 in order to determine whether the VNFs 12 that have not been set are present.

If the transfer path of after the addition of the designated VNF 12 is the transfer path that is addressed to the same destination address as that of transfer path of before the addition and that does not have a different output destination (No at Step S32), the third updating unit 46C proceeds to Step S34. The third updating unit 46C determines whether the transfer path of before the addition of the designated VNF 12 is the irrelevant transfer path after the addition (Step S34). If the transfer path of before the addition of the designated VNF 12 is the irrelevant transfer path after the addition (Yes at Step S34), the third updating unit 46C holds the irrelevant transfer path of the designated VNF 12 in the holding table 34A (Step S35). Then, the comparing unit 45 proceeds to Step S30 in order to determine whether the VNF group that has not been set is present.

If the transfer path of before the addition of the designated VNF 12 is not the irrelevant transfer path after the addition (No at Step S34), the comparing unit 45 proceeds to Step S30 in order to determine whether the VNF 12 that has not been set is present.

If the VNFs 12 that have not been set are not present in the designated VNF group 20 (No at Step S30), the comparing unit 45 determines whether the designated VNF group 20 is an LB (Step S36). If the designated VNF group is not an LB (No at Step S36), the comparing unit 45 designates the VNF group 20 in the last stage except for the designated VNF group 20 (Step S37) and proceeds to Step S26 in order to designates the VNF 12 in the designated VNF group 20. Furthermore, the VNF group 20 in the last stage at Step S37 corresponds to the VNF group #2 when the designated VNF group 20 is the VNF group #3; corresponds to the VNF group #1 when the designated VNF group 20 is the VNF group #2; and corresponds to the LB when the designated VNF group 20 is the VNF group #1.

When the designated VNF group 20 is the LB (Yes at Step S36), the setting unit 43 updates the distribution ratio of the aggregation LBs 13A of after the addition (Step S38). Furthermore, the third updating unit 46C deletes the irrelevant transfer path that is being held in the holding table 34A from the setting table 35A (Step S39) and ends the processing operation illustrated in FIG. 25.

Namely, first, the comparing unit 45 designates the VNF group #3 in the last stage; sequentially designates each of the Proxies 1 to 3 in the VNF group #3; and compares the transfer paths of before and after the addition related to the designated Proxies in the VNF group #3. Furthermore, because the VNF 12 in the VNF group #3 in the last stage is the Proxy and does not transfer the received packet, the comparing unit 45 does not need to compare the transfer paths of before and after the addition. After the completion of the comparison of the transfer paths of before and after the addition related to all of the Proxies in the VNF group #3, the comparing unit 45 designates the VNF group #2.

The comparing unit 45 sequentially designates each of the VNFs 12 in the designated VNF group #2, i.e., the IDSs 1 to 3 and then compares the transfer paths of before and after the addition related to the designated IDS in the VNF group #2. Furthermore, because the VNF 12 in the VNF group #2 is the IDS and the transfer path is not changed even before and after the addition of the FW 5, the comparing unit 45 does not need to compare the transfer paths of before and after the addition. After the completion of the comparison of the transfer paths of before and after the addition related to all of the IDSs 1 to 3 in the VNF group #2, the comparing unit 45 designates the VNF #1.

The comparing unit 45 sequentially designates each of the VNFs 12, i.e., the FWs 1 to 5, in the designated VNF group #1 and compares the transfer paths of before and after the addition of the designated FW in the VNF group #1. At this time, the storage control unit 46 performs the determination processes at Steps S28, S32, and S34. Then, the first updating unit 46A determines that, at the determination process at Step S28, the "transmission addressed to the Proxy 1 to be performed via the IDS 1" for the FW 3, the "transmission addressed to the Proxy 2 to be performed via the IDS 2" for the FW 4, and the "transmission addressed to the Proxy 3 to be performed via the IDS 3" for the FW 5 are the relevant transfer paths. Then, the first updating unit 46A additionally registers, in the setting table 35A, the transfer paths of the "transmission addressed to the Proxy 1 to be performed via the IDS 1" for the FW 3, the "transmission addressed to the Proxy 2 to be performed via the IDS 2" for the FW 4, and the "transmission addressed to the Proxy 3 to be performed via the IDS 3" for the FW 5.

Furthermore, at the determination process at Step S34, the third updating unit 46C holds, in the holding table 34A as the irrelevant transfer paths of after the addition, the "transmission addressed to the Proxy 1 to be performed via the IDS 1" for the FW 2 and the "transmission addressed to the Proxy 2 to be performed via the IDS 2" for the FW 3. Furthermore, the third updating unit 46C also holds, in the holding table 34A as the irrelevant transfer paths of after the addition, the "transmission addressed to the Proxy 3 to be performed via the IDS 3" for the FW 4.

Then, after the completion of the comparison of the transfer paths of before and after the addition related to all of the FWs 1 to 5 in the VNF group #1, the comparing unit 45 designates the VNF group 20 of the LB. The comparing unit 45 sequentially designates the designated VNF 12 in the VNP group 20 of the designated LB, i.e., the LB 1 and the LB 2. The comparing unit 45 compares the transfer paths of before and after the addition related to the designated LBs in the VNF group 20 of the LB. At this time, the comparing unit 45 performs the determination processes at Steps S28, S32, and S34. Then, the second updating unit 46B determines, at the determination process at Step S32, that the "transmission addressed to the Proxy 1 to be performed via the FW 3" for the LB 2, the "transmission addressed to the Proxy 2 to be performed via the FW 4" for the LB 2, and the "transmission addressed to the Proxy 3 to be performed via the FW 5" for the LB 2 as the relevant transfer paths. Then, the second updating unit 46B updates, on the basis of the determination result at Step S32, the "transmission addressed to the Proxy 1 to be performed via the FW 2" for the LB 2 stored in the setting table 35A to the "transmission addressed to the Proxy 1 to be performed via the FW 3". Furthermore, the second updating unit 46B updates the "transmission addressed to the Proxy 2 to be performed via the FW 3" for the LB 2 stored in the setting table 35A to the "transmission addressed to the Proxy 2 to be performed via the FW 4. Furthermore, the second updating unit 46B updates the "transmission addressed to the Proxy 3 to be performed via the FW 4" for the LB 2 stored in the setting table 35A to the "transmission addressed to the Proxy 3 to be performed via the FW 5.

Then, after the completion of the comparison of the transfer paths of before and after the addition related to all of the aggregation LBs 13A in the VNF group 20 of the aggregation LBs 13A, the setting unit 43 sets the distribution ratio of the aggregation LBs 13A of after the addition to each of the VNFs 12. Then, after having set the distribution ratio of the aggregation LBs 13A of after the addition to each of the VNFs 12, the third updating unit 46C deletes the irrelevant transfer paths that are being held in the holding table 34A from the setting table 35A. For example, the third updating unit 46C deletes, from the setting table 35A, the "transmission addressed to the Proxy 1 to be performed via the IDS 1" for the FW 2, the "transmission addressed to the Proxy 2 to be performed via the IDS 2" for the FW 3, and the "transmission addressed to the Proxy 3 to be performed via the IDS 3" for the FW 4. Consequently, in the setting table 35A, the transfer path of each of the VNFs 12 of after the addition of the FW 5 is updated. Namely, even if the FW 5 is added to the service chain system 1, it is possible to avoid the occurrence of a communication disconnection due to a time difference of the setting completion time of the aggregation LBs 13 and each of the VNFs 12.

When the management server 3 in the second embodiment adds the new VNF 12, the management server 3 acquires a transfer path of the aggregation LBs 13A and each of the VNFs 12 of before and after the addition. The management server 3 sequentially designates the VNF groups from the VNF groups 20 in the last stage, sequentially designates the VNFs 12 in the designated VNF groups 20, and compares the transfer paths of before and after the addition of the designated VNF 12. If the transfer path of after the addition of the designated VNF 12 is the transfer path addressed to the destination address that is not set before the addition, the management server 3 additionally registers the relevant transfer path of after the addition of the designated VNF into the setting table 35A. Furthermore, if the transfer path of after the addition of the designated VNF 12 is the transfer path addressed to the same destination address as that of the transfer path of before the addition and that has a different transfer path, the management server 3 updates, on the basis of the relevant transfer path of after the addition of the designated VNF 12, the relevant transfer path of before the addition in the setting table 35A.

Furthermore, if the transfer path of before the addition of the designated VNF 12 is the transfer path irrelevant to the transfer path after the addition, the management server 3 holds the irrelevant transfer path of the designated VNF 12 in the holding table 34A.

Furthermore, after the completion of the comparison of the transfer paths of before and after the addition of all of the VNFs 12 in all of the VNF group 20, the management server 3 sets the distribution ratio of the aggregation LBs 13A of after the addition and then deletes, from the setting table 35A, irrelevant transfer paths held in the holding table 34A. Namely, the management server 3 adds, to the setting table 35A, the transfer path addressed to the destination address that is not set before the addition and then updates the transfer path that is addressed to the same destination address as that of the transfer path of before the addition and that has a different output destination. Furthermore, after having set the distribution ratio of the aggregation LBs 13A of after the addition, the management server 3 deletes, from the setting table 35A, the transfer path of before the addition that is irrelevant after the addition. Consequently, even if the VNF 12 is added to the service chain system 1, it is possible to avoid the occurrence of a communication disconnection due to a time difference of the setting completion time of the transfer paths of the aggregation LBs 13 and each of the VNFs 12.

In the first embodiment, for example, if the FW 5 is added to the VNF #1, the distribution ratio and the transfer paths of the aggregation LBs 13A need to be changed; therefore, the setting change occurs in the LB 2, the FW 3, the FW 4, and the FW 5 and the setting change is not able to be simultaneously performed because, for example, the FW 4 is currently performing another process, whereby a communication disconnection occurs. Furthermore, if a change process of the FW 4 is delayed and a setting change in the LB 2 is performed in advance, even if traffic arrives at the FW 4, because the transfer path addressed to the Proxy 2 is not registered in the FW 4, a packet is discarded. However, in the second embodiment, after having added the transfer path of the destination address that is not set, after having updated the transfer path that has the same destination address of before the addition and that has a different output destination, and after having set the distribution ratio of the aggregation LBs 13A of after the addition, the transfer path that is irrelevant after the addition is deleted from the setting table 35A. Consequently, even if the VNF 12 is added to the service chain system 1, it is possible to avoid the occurrence of a communication disconnection due to a time difference of the setting completion time of the transfer paths of the aggregation LBs 13 and each of the VNFs 12.

Furthermore, in the second embodiment, a case of adding the FW 5 into the VNF group #1 has been described; however, the embodiment is not limited to the VNF group #1 and the VNF 12, such as the IDS, the Proxy, the LB, or the like, in another VNF group 20 may also be used.

Furthermore, the comparing unit 45 individually designates each of the VNFs 12 in the designated VNF group and compares the transfer paths of before and after the addition; however, the VNFs 12 in the designated VNF group may also be designated in units of the plurality of the VNFs 12 or may also be integrally designated and then the transfer paths of before and after the addition of the designated VNFs 12 may also be compared.

The third updating unit 46C determines, at Step S34, whether the transfer paths of before the addition of the designated VNF 12 are the transfer paths irrelevant to the transfer paths of after the addition and then holds the irrelevant transfer paths in the holding table 34A; however, the embodiment is not limited to this. After having set the distribution ratio of the aggregation LBs 13A of after the addition at Step S38, the third updating unit 46C determines, for each of the VNFs 12, the transfer paths of before the addition at Step S34 are the transfer paths irrelevant to the transfer paths of after the addition. Then, after having held the irrelevant transfer paths in the holding table 34A, the third updating unit 46C may also proceed to Step S39 of deleting the irrelevant transfer paths that are being held in the holding table 34A from the setting table 35A. Furthermore, the order of deleting, from the setting table 35A performed by the third updating unit 46C, the irrelevant transfer paths that are being held in the holding table 34A can be appropriately changed, for example, the irrelevant transfer paths may also be deleted from each of the VNFs 12, may also be deleted in plurality of units, or may also be integrally deleted.

The acquiring unit 44 acquires the transfer paths of before the addition from the setting table 35A; however, the acquiring unit 44 may also calculate a transfer path.

Furthermore, the management server 3 sometimes performs scale in that stops and deletes the VNF 12 in accordance with, for example, a decrease in the load in the service chain system 1. In this case, the setting of the plurality of the VNFs 12 in the service chain system 1 needs to be changed. However, because it is difficult to ensure synchronization of the setting changes of the VNFs 12, a time difference occurs between the setting completion time of the transfer paths of the aggregation LB 13A and each of the VNFs 12 and a communication disconnection consequently occurs. Thus, an embodiment of the service chain system 1 that can avoid the occurrence of a communication disconnection even if a setting change due to deletion of the VNF 12 occurs will be described below as a third embodiment.

[c] Third Embodiment

Figure 26A:
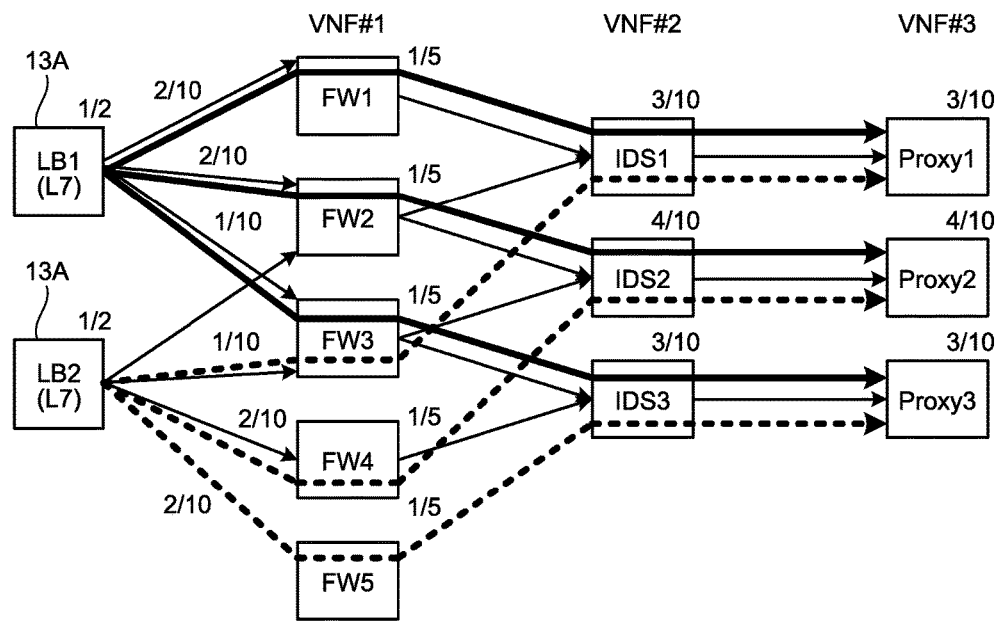
FIG. 26A is a schematic diagram illustrating an example of the arrangement configuration of before the deletion of the FW 5 according to a third embodiment.
Figure 26B:
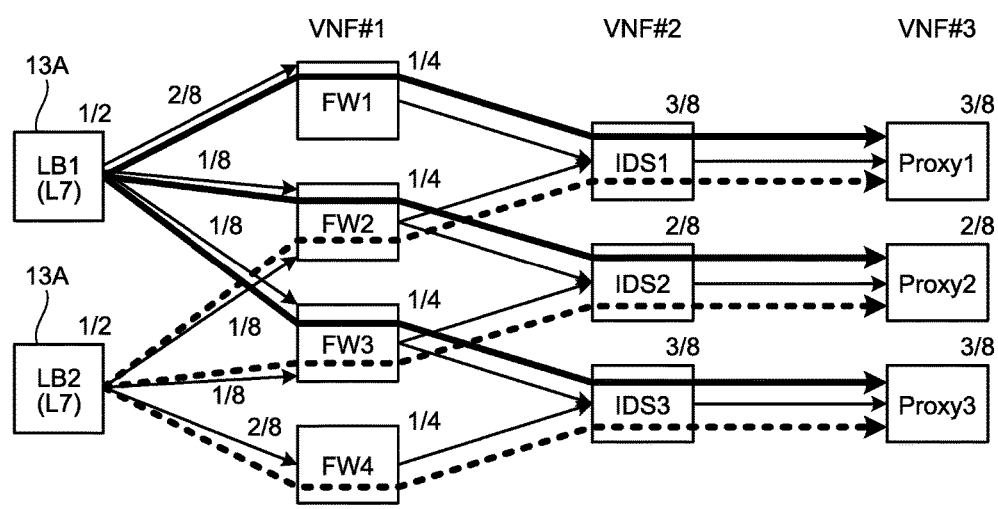
FIG. 26B is a schematic diagram illustrating an example of the arrangement configuration of after the deletion of the FW 5.

FIG. 26A is a schematic diagram illustrating an example of the arrangement configuration of before the deletion of the FW 5 according to a third embodiment; FIG. 26B is a schematic diagram illustrating an example of the arrangement configuration of after the deletion of the FW 5; and FIG. 27 is a schematic diagram illustrating an example of the distribution ratio of the aggregation LB 13A and a transfer path of each of the VNFs 12 of before and after the deletion of the FW 5.

The arrangement configuration of before the deletion of the FW 5 illustrated in FIG. 26A is the arrangement configuration of the VNF 12 of before the deletion of the FW 5, i.e., before scale in, in the service chain system 1. The arrangement configuration illustrated in FIG. 26A is set such that the two LB 1 and the LB 2 are arranged as the VNF group 20 in the first stage, the five FW 1 to the FW 5 are arranged as the VNF #1 in the next stage of the first stage, the three IDS 1 to the IDS 3 are arranged as the VNF #2 in the next stage of the VNF #1, and the three Proxy 1 to the Proxy 3 are arranged as the VNF #3 in the last stage.

The distribution ratio of the LB 1 of before the deletion of the FW 5 is set such that the transmission of 2/10 of the total amount of traffic, i.e., 1/5 of the amount of traffic received by the LB 1, addressed to the Proxy 1 is to be performed via the FW 1. Furthermore, the distribution ratio of the LB 1 is set such that the transmission of 2/10 of the total amount of traffic, i.e., 1/5 of the amount of traffic received by the LB 1, addressed to the Proxy 2 is to be performed via the FW 2. Furthermore, the distribution ratio of the LB 1 is set such that the transmission of 1/10 of the total amount of traffic, i.e., 1/10 of the amount of traffic received by the LB 1, addressed to the Proxy 3 is to be performed via the FW 3.

The distribution ratio of the LB 2 of before the deletion of the FW 5 is set such that the transmission of 1/10 of the total amount of traffic, i.e., 1/10 of the amount of traffic received by the LB 2, addressed to the Proxy 1 is to be performed via the FW 3. Furthermore, distribution ratio of the LB 2 is set such that the transmission of 2/10 the total amount of traffic, i.e., 1/5 of the amount of traffic received by the LB 2, addressed to the Proxy 2 is to be performed via the FW 4. Furthermore, the distribution ratio of the LB 2 is set such that the transmission of 2/10 of the total amount of traffic, i.e., 1/5 of the amount of traffic received by the LB 2, addressed to the Proxy 3 is to be performed via the FW 5.

The transfer path of the LB 1 of before the deletion of the FW 5 is set such that the transmission addressed to the Proxy 1 is to be performed via the FW 1, the transmission addressed to the Proxy 2 is to be performed via the FW 2, and the transmission addressed to the Proxy 3 is to be performed via the FW 3. The transfer path of the LB 2 of before the deletion of the FW 5 is set such that the transmission addressed to the Proxy 1 is to be performed via the FW 3, the transmission addressed to the Proxy 2 is to be performed via the FW 4, and the transmission addressed to the Proxy 3 is to be performed via the FW 5. The transfer path of the FW 1 of before the deletion of the FW 5 is set such that the transmission addressed to the Proxy 1 is to be performed via the IDS 1. The transfer path of the FW 2 of before the deletion of the FW 5 is set such that the transmission addressed to the Proxy 2 is to be performed via the IDS 2. The transfer path of the FW 3 of before the deletion of the FW 5 is set such that the transmission addressed to the Proxy 1 is to be performed via the IDS 1 and the transmission addressed to the Proxy 3 is to be performed via the IDS 3. The transfer path of the FW 4 of before the deletion of the FW the transmission addressed to the Proxy 2 is to be performed via the IDS 2. The transfer path of the FW 5 is set such that the transmission addressed to the Proxy 3 is to be performed via the IDS 3. The transfer path of the IDS 1 of before the deletion of the FW 5 is set such that the transmission addressed to the Proxy 1 is to be performed via the Proxy 1. The transfer path of the IDS 2 of before the deletion of the FW 5 is set such that the transmission addressed to the Proxy 2 is to be performed via the Proxy 2. The transfer path of the IDS 3 of before the deletion of the FW 5 is set such that the transmission addressed to the Proxy 3 is to be performed via the Proxy 3.

The arrangement configuration illustrated in FIG. 26B is the arrangement configuration after performing scale in that deletes the FW 5 in the VNP #2 in the arrangement configuration illustrated in FIG. 26A.

The distribution ratio of the LB 1 of after the deletion of the FW 5 is set such that the transmission of 2/8 of the total amount of traffic, i.e., 1/4 of the amount of traffic received by the LB 1, addressed to the Proxy 1 is to be performed via the FW 1. Furthermore, the distribution ratio of the LB 1 is set such that the transmission of 1/8 of the total amount of traffic, i.e., 1/8 of the amount of traffic received by the LB 1, addressed to the Proxy 2 is to be performed via the FW 2. Furthermore, the distribution ratio of the LB 1 is set such that the transmission of 1/8 of the total amount of traffic, i.e., 1/8 of the amount of traffic received by the LB 1, addressed to the Proxy 3 is to be performed via the FW 3.

The distribution ratio of the LB 2 of after the deletion of the FW 5 is set such that the transmission of 1/8 of the total amount of traffic, i.e., 1/8 of the amount of traffic received by the LB 2, addressed to the Proxy 1 is to be performed via the FW 2. Furthermore, the distribution ratio of the LB 2 is set such that the transmission of 1/8 of the total amount of traffic, i.e., 1/8 of the amount of traffic received by the LB 2, addressed to the Proxy 2 is to be performed via the FW 3. Furthermore, the distribution ratio of the LB 2 is set such that the transmission of 2/8 of the total amount of traffic, i.e., 1/4 of the amount of traffic received by the LB 2, addressed to the Proxy 3 is to be performed via the FW 4.

The transfer path of the LB 1 of after the deletion of the FW 5 is set such that transmission addressed to the Proxy 1 is to be performed via the FW 1, transmission addressed to the Proxy 2 is to be performed via the FW 2, and transmission addressed to the Proxy 3 is to be performed via the FW 3. The transfer path of the LB 2 of after the deletion of the FW 5 is set such that transmission addressed to the Proxy 1 is to be performed via the FW 2, transmission addressed to the Proxy 2 is to be performed via the FW 3, and transmission addressed to the Proxy 3 is to be performed via the FW 4. The transfer path of the FW 1 of after the deletion of the FW 5 is set such that transmission addressed to the Proxy 1 is to be performed via the IDS 1. The transfer path of the FW 2 of after the deletion of the FW 5 is set such that transmission addressed to the Proxy 1 is to be performed via the IDS 1 and transmission addressed to the Proxy 2 is to be performed via the IDS 2. The transfer path of the FW 3 of after the deletion of the FW 5 is set such that transmission addressed to the Proxy 2 is to be performed via the IDS 2 and transmission addressed to the Proxy 3 is to be performed via the IDS 3. The transfer path of the FW 4 of after the deletion of the FW 5 is set such that transmission addressed to the Proxy 3 is to be performed via the IDS 3. The transfer path of the IDS 1 of after the deletion of the FW 5 is set such that transmission addressed to the Proxy 1 is to be performed via the Proxy 1. The transfer path of the IDS 2 of after the deletion of the FW 5 is set such that transmission addressed to the Proxy 2 is to be performed via the Proxy 2. The transfer path of the IDS 3 of after the deletion of the FW 5 is set such that transmission addressed to the Proxy 3 is to be performed via the Proxy 3.

The processor 36A includes, in addition to the first decision unit 41, the second decision unit 42, and the setting unit 43, the acquiring unit 44, the comparing unit 45, and the storage control unit 46. The acquiring unit 44 acquires, from the setting table 35A, both the distribution ratio of the aggregation LBs 13A of before the deletion and the transfer path of the aggregation LBs 13A and each of the VNFs 12 of before the deletion.

Furthermore, the distribution ratio of the aggregation LBs 13A before the deletion is the distribution ratio used before the arranged VNF 12 is deleted from the service chain system 1. The transfer paths of the aggregation LBs 13A and each of the VNFs 12 of before the deletion are the transfer paths used before the arranged VNF 12 is deleted from the service chain system 1. Furthermore, the acquiring unit 44 acquires both the distribution ratio of the aggregation LBs 13A of after the deletion and the transfer paths of each of the VNFs 12 and the aggregation LBs 13A. The distribution ratio of the aggregation LBs 13A of after the deletion is the distribution ratio obtained by the second decision unit 42 when the arranged VNF 12 is deleted from the service chain system 1. The transfer paths of the aggregation LBs 13A and each of the VNFs 12 of after the deletion are the transfer paths to be used when the arranged VNF 12 is deleted from the service chain system 1. The acquiring unit 44 acquires both the transfer paths of the aggregation LBs 13A and each of the VNFs 12 of after the deletion and the distribution ratio of the aggregation LBs 13A of after the deletion calculated by the second decision unit 42B.

The comparing unit 45 designates the VNF group 20 in the last stage in the service chain system 1 and compares, for each of the VNFs 12 in the designated VNF group 20, the transfer paths of before and after the deletion. After the completion of the comparison of the transfer paths of before and after the deletion of all of the VNFs 12 in the VNF group 20 in the last stage, the comparing unit 45 then designates the VNF group 20 in the last stage. Then, the comparing unit 45 sequentially compares the transfer paths of before and after the deletion for each of the VNFs 12 in the designated VNF group 20. Namely, as illustrated in FIGS. 26A and 26B, the comparing unit 45 sequentially designates each of the VNF groups 20 in the order of the VNF #3 (Proxy) in the last stage-*the VNF #2 (IDS)→the VNF #1 (FW)→the VNF group (LB) in the first stage. Then, the comparing unit 45 sequentially compares the transfer paths of before and after the deletion for each of the VNFs 12 included in the designated VNF group 20. The storage control unit 46 includes the first updating unit 46A, the second updating unit 46B, and the third updating unit 46C. The first updating unit 46A compares, in the comparing unit 45, the transfer paths of before and after the deletion of the designated VNF 12 and determines whether the transfer path of after the deletion of the designated VNF 12 is the transfer path addressed to the destination address that is not set before the deletion. Furthermore, the destination address corresponds to the communication destination, for example, the Proxies 1 to 3 or the like, that uses the service chain, whereas the unset destination address is the destination address that is not set to the transfer path of before the deletion in the designated VNF 12.

If the transfer path of after the deletion of the designated VNF 12 is the transfer path addressed to the destination address that is not set before the deletion, the first updating unit 46A additionally registers, into the setting table 35A, the transfer path addressed to the unset destination address of the designated VNF 12. Furthermore, the setting table 35A is the area that stores therein the transfer paths of before the deletion that are currently set. When focusing on, for example, the transfer path of the FW 2 illustrated in FIG. 27, the first updating unit 46A additionally registers, into the setting table 35A, the transfer path for the "transmission addressed to the Proxy 1 to be performed via the IDS 1" as the transfer path of after the deletion that is addressed to the destination address that is not set before the deletion.

If the transfer path of after the deletion of the designated VNF 12 is not the transfer path addressed to the destination address that is not set before the deletion, the second updating unit 46B determines whether the transfer path of after the deletion of the designated VNF 12 is addressed to the same destination address as that of the transfer path of before the deletion and has a different output destination. If the transfer path of after the deletion of the designated VNF 12 is addressed to the same destination address as that of the transfer path of before the deletion and has a different output destination, the second updating unit 46B updates the relevant transfer path of the designated VNF 12 stored in the setting table 35A. When focusing on, for example, the transfer path of the LB 2 illustrated in FIG. 27, the second updating unit 46B decides the transfer path of the "transmission addressed to the Proxy 1 to be performed via the FW 2" as the transfer path that is addressed to the same destination address as that of the transfer path of before the deletion and has a different output destination. Then, the second updating unit 46B updates the transfer path the "transmission addressed to the Proxy 1 to be performed via the FW 3" for the LB 2 stored in the setting table 35A to the "transmission addressed to the Proxy 1 to be performed via the FW 2".

If the transfer path of after the deletion of the designated VNF 12 is the transfer path addressed to the same destination address as that of the transfer path of before the deletion and does not have a different output destination, the third updating unit 46C determines whether the transfer path of before the deletion of the designated VNF 12 is the transfer path that is irrelevant to the transfer path of after the deletion. If the transfer path of before the deletion of the designated VNF 12 is the transfer path that is irrelevant to the transfer path of after the deletion, the third updating unit 46C holds the irrelevant transfer path in the holding table 34A. When focusing on, for example, the transfer path of the FW 3 illustrated in FIG. 27, the third updating unit 46C decides the "transmission addressed to the Proxy 1 to be performed via the IDS 1" for the FW 3 as the transfer path of before the deletion that is irrelevant to the transfer path of after the deletion. Then, the third updating unit 46C holds the "transmission addressed to the Proxy 1 to be performed via the IDS 1" in the holding table 34A as the transfer path of before the addition used for the FW 3.

Then, after the completion of the comparison of all of the transfer paths of before and after the deletion related to all of the VNF groups 20, the setting unit 43 sets the distribution ratio of the aggregation LBs 13A of after the deletion. Furthermore, after having set the distribution ratio of the aggregation LBs 13A, the third updating unit 46C deletes, from the setting table 35A, the irrelevant transfer path that is being held in the holding table 34A. Furthermore, the setting unit 43 stops the FW 5 and deletes the FW 5 from the service chain system 1 of before the deletion.

Then, after the completion of the comparison of the transfer paths of before and after the deletion related to all of the VNFs 12 in all of the VNF groups 20, the setting unit 43 sets the distribution ratio of the aggregation LBs 13A of after the deletion. Furthermore, after having set the distribution ratio of the aggregation LBs 13A, the third updating unit 46C deletes, from the setting table 35A, irrelevant transfer paths that are being held in the holding table 34A. Consequently, the setting table 35A is updated to the transfer path of each of the VNFs 12 used after the deletion of the FW 5. Then, after having updated the setting table 35A, the setting unit 43 deletes the FW 5 from the service chain system 1.

Figure 28:
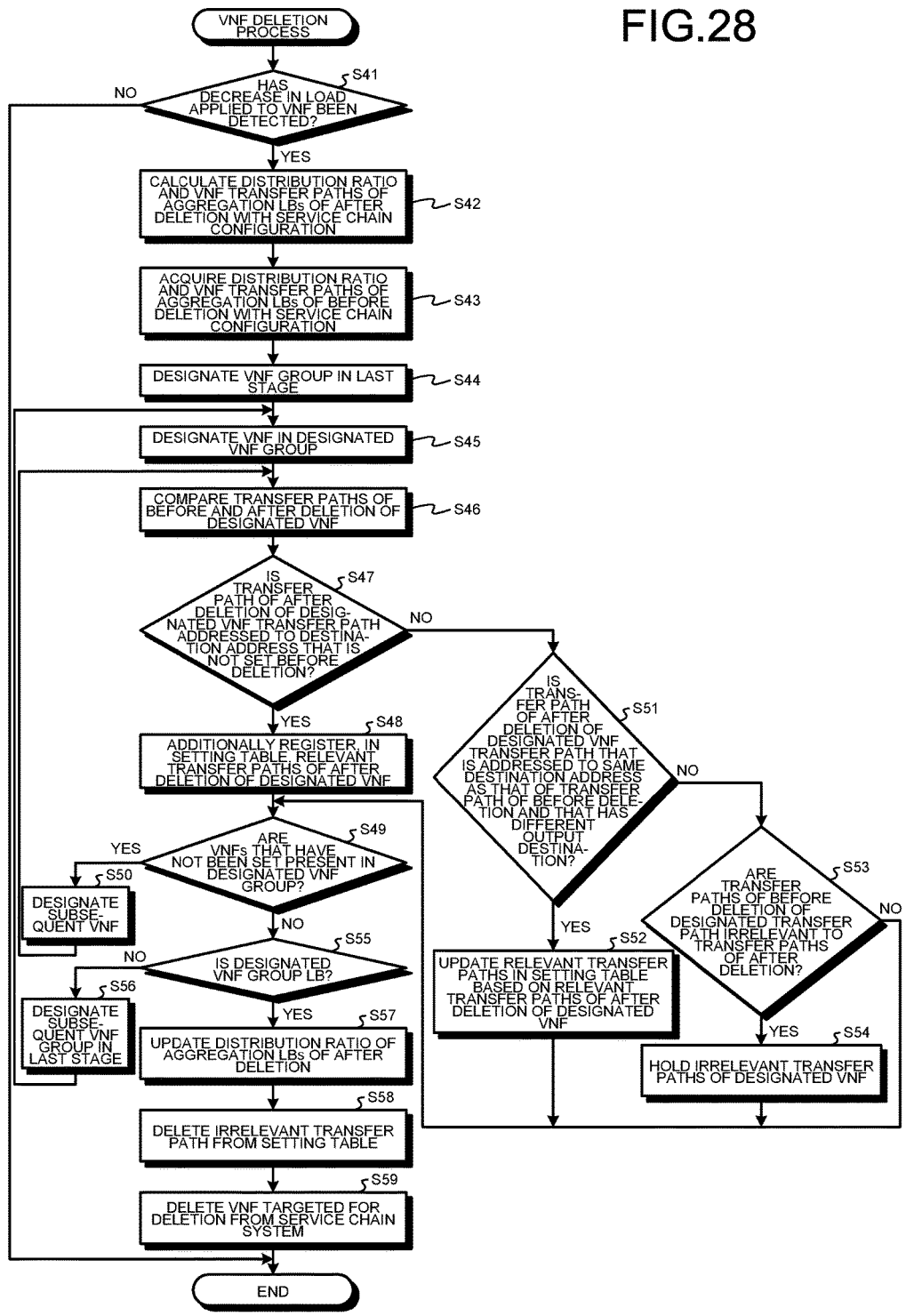
FIG. 28 is a flowchart illustrating the flow of a processing operation related to a VNF deletion process performed by the processor included in the management server.

In the following, the operation of the management server 3 performed when a VNF is deleted will be described. FIG. 28 is a flowchart illustrating the flow of a processing operation related to a VNF deletion process performed by the processor 36A included in the management server 3.

In FIG. 28, the processor 36A in the management server 3 determines whether a decrease in the load applied to the VNF 12 has been detected (Step S41). If a decrease in the load applied to the VNF 12 has been detected (Yes at Step S41), the acquiring unit 44 in the processor 36A calculates the distribution ratio and the transfer paths of the aggregation LBs 13A with the service chain configuration of after the deletion of the VNF related to the deletion of the VNF in accordance with the decrease in the load (Step S42). The acquiring unit 44 acquires, from the setting table 35A, the distribution ratio and the transfer path of the aggregation LBs 13A with the service chain configuration of before the deletion of the VNF (Step S43).

The comparing unit 45 designates the VNF group 20 in the last stage with the service chain configuration (Step S44). Furthermore, the VNF group 20 in the last stage is the VNF group #3 if the arrangement configuration illustrated in FIG. 26A is used. The comparing unit 45 designates the VNF 12 in the designated VNF group 20 (Step S45). The comparing unit 45 compares the transfer paths of before and after the deletion of the designated VNF 12 (Step S46).

The first updating unit 46A determines whether the transfer path of after the deletion of the designated VNF 12 is the transfer path addressed to the destination address that is not set before the deletion (Step S47). Furthermore, when the arrangement configuration illustrated in FIG. 26B is used, the destination addresses are, for example, the last destination addresses, such as the Proxies 1 to 3, or the like. If the transfer path of after the deletion of the designated VNF 12 is the transfer path addressed to the destination address that is not set before the deletion (Yes at Step S47), the first updating unit 46A registers, in the setting table 35A, the relevant transfer path of after the deletion of the designated VNF 12 (Step S48). After having registered the relevant transfer path in the setting table 35A, the comparing unit 45 determines whether the VNFs 12 that have not been set are present in the designated VNF group 20 (Step S49).

If the VNFs 12 that have not been set are present in the designated VNF group 20 (Yes at Step S49), the comparing unit 45 designates the subsequent VNF 12 from among the VNFs 12 that have not been set in the designated VNF group 20 (Step S50). After having designated the subsequent VNF 12, the comparing unit 45 proceeds to Step S46 in order to compare the transfer paths of before and after the deletion of the designated VNF 12.

If the transfer path of after the deletion of the designated VNF 12 is not the transfer path addressed to the destination address that is not set before the deletion (No at Step S47), the second updating unit 46B proceeds to Step S51. The second updating unit 46B determines whether the transfer path of after the deletion of the designated VNF 12 is the transfer path that is addressed to the same destination address as that of the transfer path of before the deletion and that has a different output destination (Step S51). If the transfer path of after the deletion of the designated VNF 12 is the transfer path that is addressed to the same destination address as that of the transfer path of before the deletion and that has a different output destination (Yes at Step S51), the second updating unit 46B proceeds to Step S52. The second updating unit 46B updates the relevant transfer path in the setting table 35A on the basis of the relevant transfer path of after the deletion of the designated VNF 12 (Step S52). Then, the comparing unit 45 proceeds to Step S49 in order to determine whether the VNFs 12 that have not been set are present.

If the transfer path of after the deletion of the designated VNF 12 is the transfer path that is addressed to the same destination address as that of the transfer path of before the deletion and that does not have a different output destination (No at Step S51), the third updating unit 46C proceeds to Step S53. The third updating unit 46C determines whether the transfer path of before the deletion of the designated VNF 12 is the irrelevant transfer path after the deletion (Step S53). If the transfer path of before the deletion of the designated VNF 12 is the irrelevant transfer path after the deletion (Yes at Step S53), the third updating unit 46C holds the irrelevant transfer path of the designated VNF 12 in the holding table 34A (Step S54). Then, the comparing unit 45 proceeds to Step S49 in order to determine whether the VNF group 20 that has not been set is present.

If the transfer path of before the deletion of the designated VNF 12 is not the irrelevant transfer path after the deletion (No at Step S53), the comparing unit 45 proceeds to Step S49 in order to determine whether the VNF 12 that has not been set is present.

If the VNFs 12 that have not been set are not present in the designated VNF group 20 (No at Step S49), the comparing unit 45 determines whether the designated VNF group 20 is an LB (Step S55). If the designated VNF group is an LB (No at Step S55), the comparing unit 45 designates the VNF group 20 in the last stage except for the designated VNF group 20 (Step S56) and proceeds to Step S45 in order to designate the VNF 12 in the designated VNF group 20. Furthermore, the VNF group 20 in the last stage at Step S56 corresponds to the VNF group #2 when the designated VNF group 20 is the VNF group #3; corresponds to the VNF group #1 when the designated VNF group 20 is the VNF group #2; and corresponds to the LB when the designated VNF group 20 is the VNF group #1.

When the designated VNF group 20 is the LB (Yes at Step S55), the setting unit 43 updates the distribution ratio of the aggregation LBs 13A of after the deletion (Step S57). Furthermore, the third updating unit 46C deletes the irrelevant transfer path that is being held in the holding table 34A from the setting table 35A (Step S58). Furthermore, the setting unit 43 stops the VNF 12, deletes the VNF 12 targeted for the deletion from the service chain system 1 of before the deletion (Step S59), and ends the processing operation illustrated in FIG. 28.

Namely, first, the comparing unit 45 designates the VNF group #3 in the last stage; sequentially designates each of the Proxies 1 to 3 in the VNF group #3; and compares the transfer paths of before and after the deletion related to the designated Proxies in the VNF group #3. Furthermore, because the VNF 12 in the VNF group #3 in the last stage is the Proxy and does not transfer the received packet, the comparing unit 45 does not need to compare the transfer paths of before and after the addition. After the completion of the comparison of the transfer paths of before and after the deletion related to all of the Proxies in the VNF group #3, the comparing unit 45 designates the VNF group #2.

The comparing unit 45 sequentially designates each of the VNFs 12 in the designated VNF group #2, i.e., the IDSs 1 to 3 and compares the transfer paths of before and after the deletion of the designated IDS in the VNF group #2. Furthermore, because the VNF 12 in the VNF group #2 is the IDS and the transfer path is not changed even before and after the addition of the FW 5, the comparing unit 45 does not need to compare the transfer paths of before and after the addition. After the completion of the comparison of the transfer paths of before and after the deletion related to all of the IDSs in the VNF group #2, the comparing unit 45 designates the VNF #1.

The comparing unit 45 sequentially designates each of the VNFs 12, i.e., the FWs 1 to 5, in the designated VNF group #1 and compares the transfer paths of before and after the deletion of the designated FW in the VNF group #1. At this time, the storage control unit 46 performs the determination processes at Steps S47, S51, and S53. Then, at the determination process at Step S47, the first updating unit 46A determines that the "transmission addressed to the Proxy 1 to be performed via the IDS 1" for the FW 2, the "transmission addressed to the Proxy 2 to be performed via the IDS 2" for the FW 3, and the "transmission addressed to the Proxy 3 to be performed via the IDS 3" for the FW 4 are the relevant transfer path. Then, the first updating unit 46A additionally registers, into the setting table 35A, the transfer paths of the "transmission addressed to the Proxy 1 to be performed via the IDS 1" for the FW 2, the "transmission addressed to the Proxy 2 to be performed via the IDS 2" for the FW 3, and the "transmission addressed to the Proxy 3 to be performed via the IDS 3" for the FW 4.

Furthermore, at the determination process at Step S53, the third updating unit 46C holds, as the irrelevant transfer paths after the deletion in the holding table 34A, the "transmission addressed to the Proxy 1 to be performed via the IDS 1" for the FW 3 and the "transmission addressed to the Proxy 2 to be performed via the IDS 2" for the FW 4. Furthermore, the third updating unit 46C holds, as the irrelevant transfer paths after the deletion in the holding table 34A, the "transmission addressed to the Proxy 3 to be performed via the IDS 3 for the FW 5.

Then, after the completion of the comparison of the transfer paths of before and after the deletion related to all of the FWs 1 to 5 in the VNF group #1, the comparing unit 45 designates the VNF group 20 of the LB. The comparing unit 45 sequentially the designated VNFs 12 in the designated VNF group 20 of the LB, i.e., the LB 1 and the LB 2. The comparing unit 45 compares the transfer paths of before and after the deletion related to the designated LBs in the VNF group 20 of the LB. At this time, the comparing unit 45 performs the determination processes at steps S47, S51, and S53. Then, at the determination process at Step S51, the second updating unit 46B determines that the "transmission addressed to the Proxy 1 to be performed via the FW 2", the "transmission addressed to the Proxy 2 to be performed via the FW 3", and the "transmission addressed to the Proxy 3 to be performed via the FW 4" for the LB 2 as the relevant transfer paths. Then, on the basis of the determination result at Step S51, the second updating unit 46B updates the transfer path of the "transmission addressed to the Proxy 1 to be performed via the FW 3" for the LB 2 held in the setting table 35A to the "transmission addressed to the Proxy 1 to be performed via the FW 2". Furthermore, the second updating unit 46B updates the transfer path of the "transmission addressed to the Proxy 2 to be performed via the FW 4" for the LB 2 held in the setting table 35A to the "transmission addressed to the Proxy 2 to be performed via the FW 3". Furthermore, the second updating unit 46B updates the transfer path of the "transmission addressed to the Proxy 3 to be performed via the FW 5" for the LB 2 held in the setting table 35A to the "transmission addressed to the Proxy 3 to be performed via the FW 4.

After the completion of the comparison of the transfer paths of before and after the deletion related to all of the aggregation LBs 13A in the VNF group 20 of the aggregation LBs 13A, the setting unit 43 sets the distribution ratio of the aggregation LBs 13A of after the deletion to each of the VNFs 12. Then, after having set the distribution ratio of the aggregation LBs 13A of after the deletion to each of the VNFs 12, the third updating unit 46C deletes the irrelevant transfer paths that are being held in the holding table 34A from the setting table 35A. For example, the third updating unit 46C deletes, from the setting table 35A, the "transmission addressed to the Proxy 1 to be performed via the IDS 1" for the FW 3, the "transmission addressed to the Proxy 2 to be performed via the IDS 2" for the FW 4, and the "transmission addressed to the Proxy 3 to be performed via the IDS 3" for the FW 5. Consequently, in the setting table 35A, the transfer path of each of the VNFs 12 of after the deletion of the FW 5 has been updated. Then, the setting unit 43 stops the FW 5 targeted for the deletion and deletes the targeted FW 5 from the service chain system 1. Namely, even if the FW 5 is deleted from the service chain system 1, it is possible to avoid the occurrence of a communication disconnection due to a time difference of the setting completion time of the aggregation LBs 13A and each of the VNFs 12.

When the management server 3 according to the third embodiment deletes the VNF 12 from the service chain system 1, the management server 3 acquires the transfer paths of the aggregation LB 13A and each of the VNFs 12 of before and after the deletion. The management server 3 sequentially designates the VNF groups 20 from among the VNF groups 20 in the last stage, sequentially designates the VNFs 12 in the designated VNF groups 20, and compares the transfer paths of before and after the deletion of the designated VNFs 12. If the transfer path of after the deletion of the designated VNF 12 is the transfer path addressed to the destination address that is not set before the deletion, the management server 3 additionally registers, into the setting table 35A, the relevant transfer path of after the deletion of the designated VNF 12. Furthermore, if the transfer path of after the deletion of the designated VNF 12 is addressed to the same destination address as that of the transfer path of before the deletion and has a different output destination, the management server 3 updates, on the basis of the relevant transfer path of after the deletion of the designated VNF 12, the relevant transfer path of before the deletion in the setting table 35A.

Furthermore, if the transfer path of before the deletion of the designated VNF 12 is the transfer path irrelevant to the transfer path of after the deletion, the management server 3 holds the irrelevant transfer path of the designated VNF 12 in the holding table 34A.

Furthermore, after the completion of the comparison of the transfer paths of before and after the deletion of all of the VNFs 12 in all of the VNF groups 20, the management server 3 sets the distribution ratio of the aggregation LBs 13A of after the deletion and then deletes, from the setting table 35A, the irrelevant transfer paths that are being held in the holding table 34A. Namely, the management server 3 adds, to the setting table 35A, the transfer path addressed to the destination address that is not set before the deletion and then updates the transfer path that is addressed to the same destination address as that of the transfer path of before the deletion and that has a different output destination. Furthermore, after having set the distribution ratio of the aggregation LBs 13A of after the deletion, the management server 3 deletes, from the setting table 35A, the transfer path of before the deletion that is irrelevant after the deletion. Then, the management server 3 stops the VNF 12 targeted for the deletion and deletes the targeted VNF 12 from the service chain system 1. Consequently, even if the VNF 12 is deleted from the service chain system 1, it is possible to avoid the occurrence of a communication disconnection due to a time difference of the setting completion time of the transfer paths of the aggregation LBs 13A and each of the VNFs 12.

In the first embodiment, for example, if the FW 5 of the VNF #1 is deleted, the distribution ratio of the aggregation LBs 13A and the transfer paths need to be changed; therefore, the setting change occurs in the LB 2, the FW 3, and the FW 4 and the setting change is not able to be simultaneously performed because, for example, the FW 4 is currently performing another process, whereby a communication disconnection occurs. Furthermore, if a change process of the FW 4 is delayed and a setting change in the LB 2 is performed in advance, even if traffic arrives at the FW 4, because the transfer path addressed to the Proxy 2 is not registered in the FW 4, a packet is discarded. However, in the third embodiment, after having added the transfer path of the destination address that is not set, after having updated the transfer path that has the same destination address of before the deletion and that has a different output destination, and after having set the distribution ratio of the aggregation LBs 13A of after the deletion, the transfer path that is irrelevant after the deletion is deleted from the setting table 35A. Consequently, even if the VNF 12 is deleted from the service chain system 1, it is possible to avoid the occurrence of a communication disconnection due to a time difference of the setting completion time of the transfer paths of the aggregation LBs 13 and each of the VNFs 12.

Furthermore, in the third embodiment, a case of deleting the FW 5 from the VNF group #1 has been described; however, the embodiment is not limited to the VNF group #1 and the VNF 12, such as the IDS, the Proxy, the LB, or the like, in another VNF group 20 may also be used.

Furthermore, the comparing unit 45 individually designates each of the VNF 12 in the designated group VNF and compares the transfer paths of before and after the deletion; however, the VNFs 12 in the designated VNF group may also be designated in units of the plurality of the VNFs 12 or designated integrally and then the transfer paths of before and after the deletion of each of the designated VNFs 12 may also be compared.

The third updating unit 46C determines, at Step S53, whether the transfer paths of before the deletion of the designated VNF 12 are the transfer paths irrelevant to the transfer paths of after the deletion and then holds the irrelevant transfer paths in the holding table 34A; however, the embodiment is not limited to this. After having set the distribution ratio of the aggregation LBs 13 of after the deletion at Step S57, the third updating unit 46C determines, for each of the VNFs 12, the transfer paths of before the deletion at Step S53 are the transfer paths irrelevant to the transfer paths after the deletion. Then, after having held the irrelevant transfer paths in the holding table 34A, the third updating unit 46C may also proceed to Step S58 of deleting the irrelevant transfer paths that are being held in the holding table 34A from the setting table 35A.

The third updating unit 46C deletes the transfer path irrelevant after the deletion from the setting table 35A; however, because the setting unit 43 stops the FW 5 and deletes the FW 5 from the service chain system 1, the FW 5 does not need to be deleted from the setting table 35A.

Furthermore, the components of each unit illustrated in the drawings are not always physically configured as illustrated in the drawings. In other words, the specific shape of a separate or integrated unit is not limited to the drawings; however, all or part of the unit can be configured by functionally or physically separating or integrating any of the units depending on various loads or use conditions.

Furthermore, all or any part of various kinds of processing functions performed by each unit may also be executed by a central processing unit (CPU), a digital Signal processor (DSP), a field programmable gate array (FPGA), or the like. Furthermore, all or any part of the various kinds of processing functions may also be executed by programs analyzed and executed by the CPU and the like or executed by hardware by wired logic.

The area in which various kinds of information is stored is, for example, a read only memory (ROM) or a random access memory (RAM), such as a synchronous dynamic random access memory (SDRAM), a magnetoresistive random access memory (MRAM), a non volatile memory (NVRAM), or the like.

Figure 29:
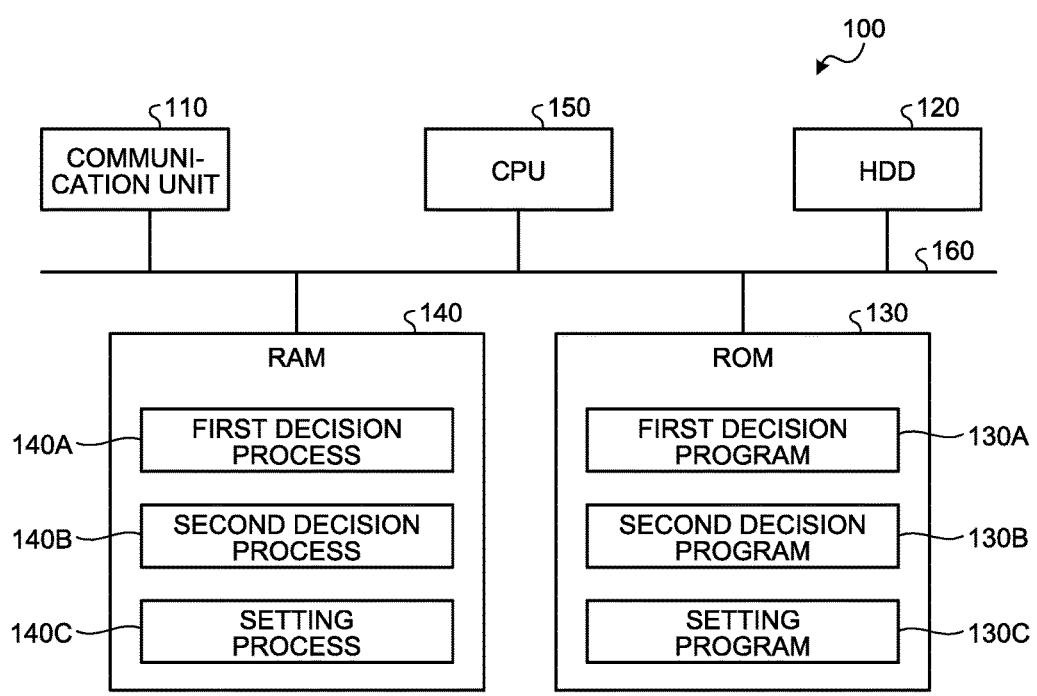
FIG. 29 is a block diagram illustrating an example of an information processing apparatus that executes a service chain construction program.
Figure 30:
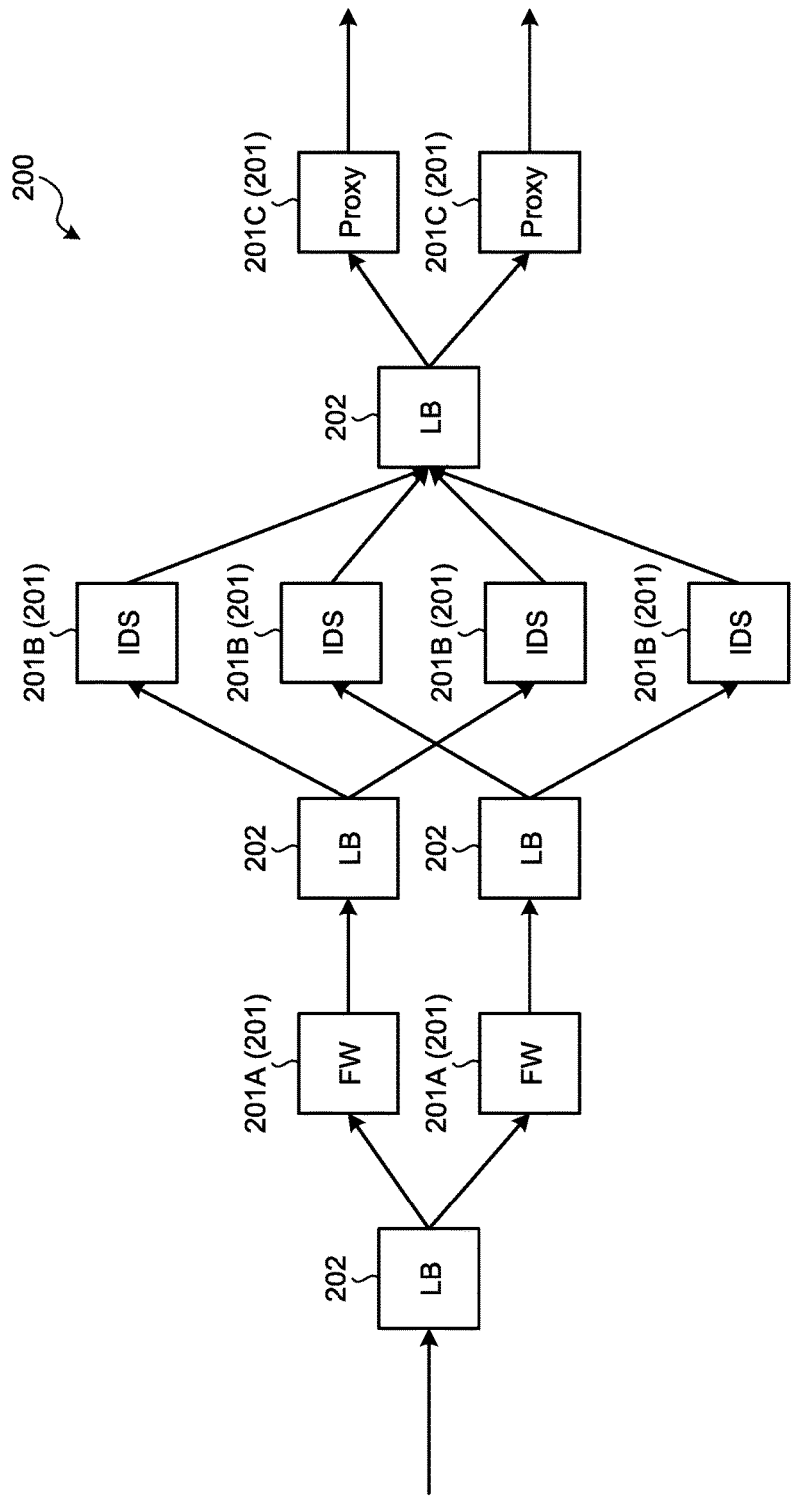
FIG. 30 is a schematic diagram illustrating an example of the arrangement configuration of a service chain.

The various processes described in the embodiments can be implemented by a program prepared in advance and executed by a processor, such as a CPU or the like, in a computer. Accordingly, in the following, an example of an information processing apparatus that executes a program having the same function as that performed in the embodiment described above. FIG. 29 is a block diagram illustrating an example of an information processing apparatus that executes a service chain construction program.

An information processing apparatus 100 that executes a service chain construction program illustrated in FIG. 29 includes a communication unit 110, a hard disc drive (HDD) 120, a ROM 130, a RAM 140, and a CPU 150. The communication unit 110, the HDD 120, the ROM 130, the RAM 140, and the CPU 150 are connected via a bus 160. The communication unit 110 is connected to another information processing apparatus that is not illustrated and performs communication with the other information processing apparatus. Then, the information processing apparatus 100 performs communication with the other information processing apparatus, arranges virtual communication function groups in a plurality of stages in a virtual area in the other information processing apparatus, and constructs a service chain.

Furthermore, the ROM 130 stores therein, in advance, a service chain construction program having the same function as that performed in the embodiment described above. A first decision program 130A, a second decision program 130B, and a setting program 130C are stored in the ROM 130 as a service chain construction program.

Furthermore, instead of the ROM 130, the service chain construction program may also be stored in a computer readable recording medium in a drive that is not illustrated. Furthermore, the recording medium may also be, for example, a portable recording medium, such as a CD-ROM, a DVD disk, a USB memory, or the like, or a semiconductor memory, such as a flash memory, or the like.

Then, the CPU 150 reads the first decision program 130A from the ROM 130 and allows the first decision program 130A to function as a first decision process 140A on the RAM 140. Furthermore, the CPU 150 reads the second decision program 130B from the ROM 130 allows the second decision program 130B to function as a second decision process 140B on the RAM 140. Furthermore, the CPU 150 reads the setting program 130C from the ROM 130 and allows the setting program 130C to function as a setting process 140C on the RAM 140.

The CPU 150 decides, when virtual communication function groups are arranged in a plurality of stages in a virtual area, a virtual distributed function that is to be arranged in the previous stage of the virtual communication function group that is in a first stage of the plurality of stages. The CPU 150 decides a communication path based on a load from the virtual distributed function to each of the virtual communication functions in a terminal virtual communication function group from among the plurality stages of the virtual communication function groups. The CPU 150 sets the decided communication path to the virtual distributed function and each of the virtual communication functions arranged in the virtual area. Consequently, when the service chain is constructed, the number of virtual distributed functions can be reduced and a transfer delay can be suppressed.

According to an aspect of an embodiment, a transfer delay can be suppressed by aggregating virtual distributed functions.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A setting method that is implemented by a server device, the setting method comprising:
   first deciding, when virtual communication function groups are arranged in a plurality of stages in a virtual area, a virtual distributed function that is to be arranged in the previous stage of the virtual communication function group that is in a first stage of the plurality of stages;
   second deciding a communication path based on a load from the virtual distributed function to each of the virtual communication functions in a terminal virtual communication function group from among the plurality stages of the virtual communication function groups; and
   setting the decided communication path to the virtual distributed function and each of the virtual communication functions arranged in the virtual area, wherein
   the virtual distributed function is arranged in only the first stage of the virtual communication function group from among the plurality stages of the virtual communication function groups.

2. The setting method according to claim 1, wherein the first deciding includes deciding, on the basis of the number of the virtual communication functions in each of the virtual communication function groups that are designated when the virtual communication function groups are arranged in the plurality of stages in the virtual area, the number of the virtual distributed functions to be arranged in the previous stage of the virtual communication function group that is in the first stage.

3. The setting method according to claim 2, wherein the first deciding includes specifying a virtual communication function group with an arbitrary functional characteristic in each of the designated virtual communication function groups and deciding the number of the virtual distributed functions in accordance with the number of the virtual communication functions in the specified virtual communication function group.

4. The setting method according to claim 3, wherein the first deciding includes specifying a virtual communication function group with an arbitrary functional characteristic in each of the designated virtual communication function groups, specifying a virtual communication function group with the maximum number of virtual communication functions from among the specified virtual communication function groups, and deciding the number of the virtual distributed functions in accordance with the number of the virtual communication functions in the specified virtual communication function group with the maximum number of the virtual communication functions.

5. The setting method according to claim 2, wherein the first deciding includes specifying a virtual communication function group with a higher layer characteristic from among the functional characteristics from each of the designated virtual communication function groups and deciding the number of the virtual distributed functions in accordance with the number of the virtual communication functions in the specified virtual communication function group.

6. The setting method according to claim 2, wherein the first deciding includes specifying a virtual communication function group with an arbitrary functional characteristic from among the plurality of the virtual communication function groups on the basis of the number of the virtual distributed functions for each of the virtual communication function groups that are designated when the virtual communication function groups are arranged in the plurality of stages in the virtual area, deciding the number of the virtual distributed functions in accordance with the number of the virtual distributed functions associated with the specified virtual communication function group, and deleting the number of the designated virtual distributed functions.

7. The setting method according to claim 2, wherein
the second deciding includes
    third deciding terminal virtual communication functions in the plurality of the virtual communication function groups and deciding optimal paths starting from the virtual distributed function to each of the terminal virtual communication functions,
    fourth deciding the communication path of the virtual distributed function regarding the distribution ratio of the traffic from the virtual distributed function to the virtual communication function in each of the first stages such that, from among the virtual communication function groups arranged in the optimal paths, the amount of traffic applied to each of the virtual communication functions in the virtual communication function group with the maximum number of the virtual communication functions is equal, and
    fifth deciding the communication path of the virtual distributed function regarding the traffic ratio of each of the virtual communication functions such that the ratio of the amount of traffic of each of the virtual communication functions arranged for each of the optimal paths is optimal, and
the setting includes
    arranging, on the basis of the number of the virtual distributed functions decided by the first deciding and the optimal paths decided by the third deciding, the virtual distributed function and each of the virtual communication functions in the virtual area, and
    setting the communication path of the virtual distributed functions decided by the fourth deciding to the virtual distributed functions arranged in the virtual area and setting the communication path of each of the virtual communication functions decided by the fifth deciding to the virtual communication functions in the virtual area.

8. The setting method according to claim 7, wherein
the first deciding includes deciding the number of the virtual distributed functions with an arbitrary functional characteristic from among functional characteristics in each of the designated virtual communication function groups,
the third deciding includes deciding, from among the virtual communication function groups, terminal virtual communication functions with the arbitrary functional characteristic and deciding optimal paths starting from the virtual distributed function to each of the terminal virtual communication functions, and
the fourth deciding includes specifying, from among the virtual communication function groups with the arbitrary functional characteristic in each of the optimal paths, a virtual communication function group with the maximum number of the virtual communication function and deciding the distribution ratio from the virtual distributed function to each of the virtual communication functions in the first stage such that the amount of traffic of each of the virtual communication functions in the specified virtual communication function group is equal.

9. The setting method according to claim 1 further comprising:
registering, in a setting table from among the virtual distributed functions and the virtual communication functions arranged in the virtual area, a transfer path for each of the virtual distributed functions and each of the virtual communication functions starting from the virtual distributed functions to each of the terminal virtual communication functions;
acquiring, when the virtual communication functions in the virtual area are changed, the transfer paths of before and after the changes for each of the virtual distributed functions and the virtual communication functions arranged in the virtual area;
sequentially designating the virtual communication function groups included between the terminal virtual communication function group and the virtual communication function group in the first stage, comparing the transfer paths of before and after the changes of each of the virtual communication functions included in the designated virtual communication function groups, and comparing, when the transfer paths of before and after the changes of all of the virtual communication functions included in the virtual communication function group in the first stage have been compared, the transfer paths of before and after the changes of the virtual distributed functions; and
updating, on the basis of a comparison result of the transfer paths of before and after the changes for each of the virtual communication functions or for each of the virtual distributed functions included in the designated virtual communication function groups, the transfer paths stored in the setting table to the transfer paths of after the change, setting, on the basis of the comparison result, the ratio of each of the amounts of traffic of after the change into the virtual distributed functions and each of the virtual communication functions arranged in the virtual area, and then deleting, from the setting table on the basis of the comparison result, a transfer path that corresponds to the transfer path of before the change is irrelevant to the transfer path of after the change.

10. The setting method according to claim 9, wherein
the updating the transfer paths stored in the setting table includes
registering, in the setting table on the basis of the comparison result of the transfer paths of before and after the changes for each of the virtual communication functions or for each of the virtual distributed functions included in the designated virtual communication function groups, a transfer path addressed to the terminal destination that is not set before the change from among the transfer paths of after the change,
updating, on the basis of the comparison result and on the basis of, from among the transfer paths of after the change, a transfer path that is addressed to the same terminal destination as that of the transfer path before the change and whose output destination is addressed to a different virtual communication function, the relevant transfer path in the setting table, and
setting the ratio of each of the amounts of traffic of after the change into the virtual distributed functions and each of the virtual communication functions arranged in the virtual area and then deleting, from the setting table on the basis of the comparison result, the transfer path that corresponds to the transfer path of before the change is irrelevant to the transfer path of after the change.

11. A server device comprising:
a processor configured to:
decide, when virtual communication function groups are arranged in a plurality of stages in a virtual area, a virtual distributed function that is to be arranged in the previous stage of the virtual communication function group that is in a first stage of the plurality of stages;
decide a communication path based on a load from the virtual distributed function to each of the virtual communication functions in a terminal virtual communication function group from among the plurality stages of the virtual communication function groups; and
set the decided communication path to the virtual distributed function and each of the virtual communication functions arranged in the virtual area, wherein
the virtual distributed function is arranged in only the first stage of the virtual communication function group from among the plurality stages of the virtual communication function groups.

12. A service chain system comprising:
a server device that arranges virtual communication function groups in a plurality of stages in a virtual area and that constructs a service chain, wherein
the server device includes a processor configured to:
decide, when the virtual communication function groups are arranged in the plurality of stages in the virtual area, a virtual distributed function that is to be arranged in the previous stage of the virtual communication function group that is in a first stage of the plurality of stages;
decide a communication path based on a load from the virtual distributed function to each of the virtual communication functions in a terminal virtual communication function group from among the plurality stages of the virtual communication function groups; and
set the decided communication path to the virtual distributed function and each of the virtual communication functions arranged in the virtual area,
wherein
the virtual distributed function is arranged in only the first stage of the virtual communication function group from among the plurality stages of the virtual communication function groups.

* * * * *